US012780551B1

(12) United States Patent
McCormack et al.

(10) Patent No.: US 12,780,551 B1
(45) Date of Patent: Nov. 3, 2026

(54) ORDER-FULFILLMENT SYSTEM INCLUDING MULTIPURPOSE MOBILE ROBOTS AND RELATED TECHNOLOGY

(71) Applicant: Agility Robotics, Inc., Pittsburgh, PA (US)

(72) Inventors: Ken McCormack, Albany, OR (US); Jay Jasper, Albany, OR (US); Jonathan Hurst, Albany, OR (US); Prasanna Velagapudi, Pittsburgh, PA (US); Bradley Hamner, Pittsburgh, PA (US)

(73) Assignee: Agility Robotics, Inc., Salem, OR (US)

(*) Notice: Subject to any disclaimer, the term of this patent is extended or adjusted under 35 U.S.C. 154(b) by 448 days.

(21) Appl. No.: 18/431,799

(22) Filed: Feb. 2, 2024

Related U.S. Application Data

(60) Provisional application No. 63/626,434, filed on Jan. 29, 2024, provisional application No. 63/605,567, filed on Dec. 3, 2023.

(51) Int. Cl.
*B65G 1/137* (2006.01)
*G05D 1/69* (2024.01)

(52) U.S. Cl.
CPC ............. *B65G 1/1375* (2013.01); *G05D 1/69* (2024.01)

(58) Field of Classification Search
CPC ................................ B65G 1/1375; G05D 1/69
See application file for complete search history.

(56) References Cited

U.S. PATENT DOCUMENTS

| | | | | |
|---|---|---|---|---|
| 10,150,213 | B1 | 12/2018 | Linnell et al. | |
| 10,417,892 | B2 | 9/2019 | Das et al. | |
| 11,004,033 | B1 | 5/2021 | Theobald et al. | |
| 11,059,177 | B1 | 7/2021 | Arora et al. | |
| 11,198,561 | B2 | 12/2021 | Buchmann | |
| 11,427,404 | B2 | 8/2022 | Cairl et al. | |
| 2016/0129592 | A1* | 5/2016 | Saboo | B25J 15/0625 700/248 |

(Continued)

FOREIGN PATENT DOCUMENTS

| | | | | |
|---|---|---|---|---|
| EP | 3955189 A1 | * 2/2022 | | B25J 9/1661 |
| JP | 2022550502 A | * 12/2022 | | B25J 15/00 |

OTHER PUBLICATIONS

JP2022550502_EN_description_with_paragraph_numbers_espacenet (Year: 2022).*

*Primary Examiner* — Jacob S. Scott
*Assistant Examiner* — Erin Morris

(57) ABSTRACT

A method in accordance with a particular embodiment of the present technology includes implementing an order-fulfillment workflow via an order-fulfillment system including a fleet of bimanual mobile robots respectively equipped with end-effector sets. The fleet includes subfleets assigned to different respective operation types within the order-fulfillment workflow. The method further includes receiving updated information for the order-fulfillment workflow and determining a reallocation of at least some of the mobile robots among the subfleets based at least partially on the updated information. The method also includes implementing the reallocation by, in part, changing the respective end-effector sets of the reallocated mobile robots from first end-effector sets of a first set type to second end-effector sets of a second set type different than the first set type.

20 Claims, 14 Drawing Sheets

(56) References Cited

U.S. PATENT DOCUMENTS

| | | | | |
|---|---|---|---|---|
| 2016/0280461 | A1 | 9/2016 | Geiger | |
| 2019/0182499 | A1 | 6/2019 | Richert | |
| 2020/0103921 | A1* | 4/2020 | Voorhies | G05D 1/0088 |
| 2020/0202285 | A1* | 6/2020 | Elazary | B65G 1/1375 |
| 2020/0407165 | A1 | 12/2020 | Roth et al. | |
| 2021/0188551 | A1 | 6/2021 | Blotnik et al. | |
| 2021/0188553 | A1 | 6/2021 | Blotnik et al. | |
| 2021/0248781 | A1 | 8/2021 | Ding et al. | |
| 2021/0276203 | A1 | 9/2021 | Carithers | |
| 2021/0323768 | A1 | 10/2021 | Lisso | |
| 2021/0389751 | A1 | 12/2021 | Wise et al. | |
| 2022/0135346 | A1 | 5/2022 | Matsuoka et al. | |
| 2023/0066910 | A1 | 3/2023 | Scott | |
| 2023/0081119 | A1 | 3/2023 | Rohanimanesh | |
| 2023/0124672 | A1 | 4/2023 | Menon et al. | |
| 2023/0202037 | A1 | 6/2023 | Andreoni et al. | |
| 2023/0230031 | A1 | 7/2023 | Lert, Jr. et al. | |
| 2023/0325768 | A1 | 10/2023 | Kamgar et al. | |
| 2023/0331498 | A1 | 10/2023 | Hau | |
| 2023/0356387 | A1 | 11/2023 | Kalouche | |

* cited by examiner

| End-Effector Set | Right End Effector | Left End Effector | Subfleet(s) |
|---|---|---|---|
| 502a | 230 (Suction Plate) | 270 (Scraper) | 404a |
| 502b | 220 (Cutter) | 270 (Scraper) | 404b |
| 502c | 260 (Paddle) | 260 (Paddle) | 404c, 404j |
| 502d | 200 (Suction Wand) | 250 (Conveyor Plates) | 404d, 404g |
| 502e | 210 (Pincer) | 210 (Pincer) | 404e, 404f, 404h |
| 502f | 200 (Suction Wand) | 270 (Spatula) | 404i |
| 502g | 240 (Taper) | 270 (Scraper) | 404k |
| 502h | 230 (Suction Plate) | 230 (Suction Plate) | 404l |

| Workflow Sequence | Area(s) | Manipulation Level | Operation Type | Automation | Subfleet |
|---|---|---|---|---|---|
| 1 | 702a | Pallet | Pallet Moving | Forklift | N/A |
| 2 | 702g, 702h | Box | Box Carrying | Mobile Robot with End-Effector Set 502a | 404a |
| 3 | 702h | Box | Box Unsealing | Mobile Robot with End-Effector Set 502b | 404b |
| 4 | 702h | Box | Box Sliding | Mobile Robot with End-Effector Set 502b | 404b |
| 5 | 702h, 702i | Box | Box Carrying | Mobile Robot with End-Effector Set 502c | 404c |
| 6 | 702j | Item | Item Carrying | Mobile Robot with End-Effector Set 502d | 404d |
| 7 | Between 702j and 702k | Item | Tote Loading | Automated Put Wall | N/A |
| 8 | 702k | Tote | Tote Carrying | Mobile Robot with End-Effector Set 502e | 404e |
| 9 | Between 702k and 702l | Tote | Tote Storing | Automated Storage and Retrieval System | N/A |
| 10 | 702l | Tote | Tote Carrying | Mobile Robot with End-Effector Set 502e | 404f |
| 11 | 702m | Item | Item Carrying | Mobile Robot with End-Effector Set 502d | 404g |
| 12 | Between 702m and 702n | Item | Item Sorting by Order | Automated Put Wall | N/A |
| 13 | 702n | Tote | Tote Carrying | Mobile Robot with End-Effector Set 502e | 404h |
| 14 | 702o | Item | Item Carrying | Mobile Robot with End-Effector Set 502f | 404i |
| 15 | 702o | Box | Box Sliding | Mobile Robot with End-Effector Set 502f | 404i |
| 16 | 702p, 702q | Box | Box Carrying | Mobile Robot with End-Effector Set 502c | 404j |
| 17 | 702q | Box | Box Sealing | Mobile Robot with End-Effector Set 502g | 404k |
| 18 | 702q | Box | Box Sliding | Mobile Robot with End-Effector Set 502g | 404k |
| 19 | 702q, 702r | Box | Box Moving | Mobile Robot with End-Effector Set 502h | 404l |
| 20 | 702b | Pallet | Pallet Moving | Forklift | N/A |

*Fig. 15*

ORDER-FULFILLMENT SYSTEM INCLUDING MULTIPURPOSE MOBILE ROBOTS AND RELATED TECHNOLOGY

CROSS-REFERENCE TO RELATED APPLICATIONS

This claims the benefit of: (1) U.S. Provisional Application No. 63/605,567, filed Dec. 3, 2023; and (2) U.S. Provisional Application No. 63/626,434, filed Jan. 29, 2024. The foregoing applications are incorporated herein by reference in their entirety. To the extent the foregoing applications or any other material incorporated by reference conflicts with the present disclosure, the present disclosure controls.

TECHNICAL FIELD

The present technology relates to automating order-fulfillment.

BACKGROUND

Much of the work that humans currently perform is amenable to automation using robotics. For example, large numbers of human workers currently focus on executing actions that require little or no reasoning, such as predefined relocations of items and containers at order-fulfillment centers. Such actions may occur millions of times a day at a single order-fulfillment center and billions of times a day across a network of order-fulfillment centers. Human effort would be better applied to more complex tasks, particularly those involving creativity, advanced problem solving, and social interaction. Presently, however, the need for order-fulfillment centers is large and rapidly increasing. Some analysts forecast a shortage of a million or more workers to staff order-fulfillment centers within the next ten to fifteen years. Due to the importance of this field, even small improvements in efficiency can have major impacts on macroeconomic productivity. For at least these reasons, there is a significant and growing need for innovation that supports automating tasks that humans currently perform at order-fulfillment centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

FIG. 15 is a table showing an order-fulfillment workflow implemented via the order-fulfillment system of FIG. 8 at the order-fulfillment center of FIGS. 13 and 14 in accordance with at least some embodiments of the present technology.

DETAILED DESCRIPTION

Figure 1:
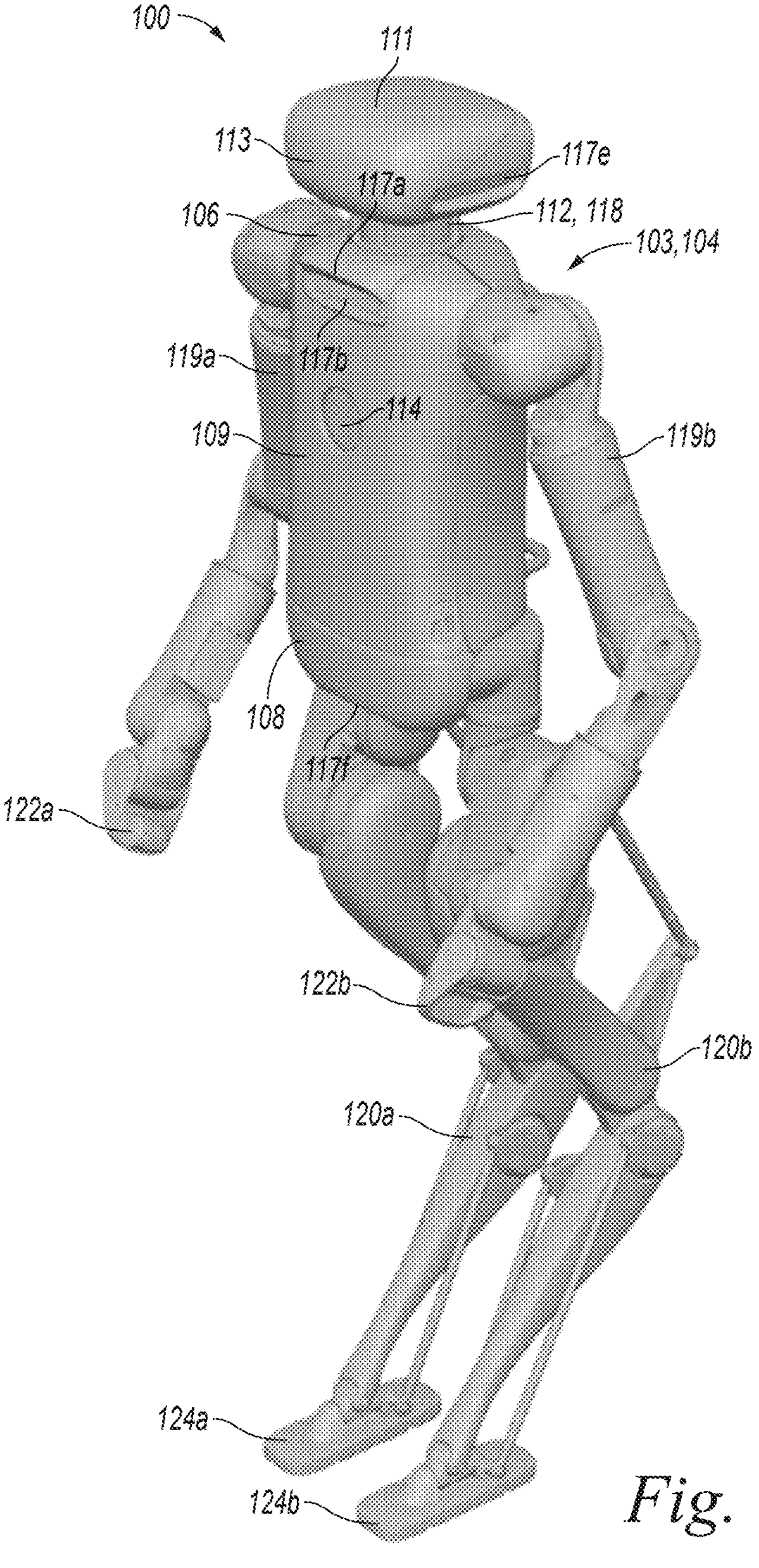
FIGS. 1-3 are, respectively, a first perspective view, a second perspective view, and a front profile view of a mobile robot in accordance with at least some embodiments of the present technology.

At a high level, order fulfillment involves receiving goods, storing the goods in inventory, retrieving the goods from inventory as needed, and packaging the goods for shipment to consumers in response to orders. In the context of online retail, these operations typically occur at an order-fulfillment center. For online retailers, the efficiency of order fulfillment is often the primary determinant of cost and profit. It also tends to dictate how long consumers must wait between placing an order and receiving the ordered goods. As online retail replaces other forms of retail, the importance of innovations related to order fulfillment also increases. Indeed, a relentless focus on order-fulfillment technology in online retail and related industries in recent years has provided consumers with access to fast and low-cost home delivery of millions of different products. In some cases, goods may move from inventory to a consumer's doorstep on demand in just a few hours. Not long ago, this level of convenience would have been difficult to imagine.

Aside from packing and unpacking, most order-fulfillment operations involve moving goods from one place to another. In an example of a typical end-to-end order-fulfillment process, goods are, in order, depalletized, singulated, stowed, stored, retrieved, sorted, packaged, and palletized. Modern order-fulfillment processes do not store goods in inventory by category. Rather, individual items within certain thresholds of size and weight are inventoried randomly. The location of every item is cataloged in a database that updates automatically as the items move. For example, a human worker moving an item may scan a barcode on the item to change the location of the item in the database. Although human workers currently do much of the actual moving of items, computer systems often coordinate this movement. For example computer systems can generate instructions to move items into and out of inventory in concert with customer orders. Very little human reasoning is involved in any individual aspect of implementing this coordinated movement of items. Large numbers of human workers, however, are still needed for conventional order-fulfillment centers to operate. Operating a single, full-scale order-fulfillment center, for example, can require over one thousand full-time human workers. Human workers, of course, are expensive to retain and support, but their flexibility is invaluable. Among other types of flexibility, a human worker can easily switch from performing one task to performing another task. Such flexibility has conventionally been unavailable in automated systems.

Most of the innovation in order fulfillment to date has involved automating specific operations in an order-fulfillment workflow. For example, presently available automated storage and retrieval systems bring inventory totes to human workers rather than requiring human workers to travel to the inventory totes. As another example, presently available automated put walls sort batch-picked items into order-specific totes rather than relying on human workers for this tedious task. These and other forms of automation, while extremely useful, are limited in that they still rely on human intervention both immediately upstream and immediately downstream. These and similar systems, therefore, effectively create "islands of automation" in human-centric workflows. Moreover, the equipment associated with such systems tends to be purpose-built and, therefore, may be difficult or impossible to modify to accommodate changes in demand for various operations within an order-fulfillment workflow. Such changes, however, are inevitable. As one example, demand for operations related to unpacking and storing goods typically increases shortly before traditional shopping seasons and then decreases during these seasons. Correspondingly, demand for operations related to retrieving and packaging goods typically increases during traditional shopping seasons and then decreases after these seasons. End-to-end automation using conventional automation systems built for maximum possible capacities across all variable-demand operation types within an order-fulfillment workflow would be highly impractical. In real-world implementations, a necessary balancing of capital efficiency with throughput prevents automation from reaching its full potential. For these and/or other reasons, there is a need for automation with flexibility rivaling that of a human workforce.

Devices, systems, and methods in accordance with at least some embodiments of the present technology include one or more innovations related to using mobile robots to improve order fulfillment. In particular, methods in accordance with at least some embodiments of the present technology include using a fleet of mobile robots having a common base form and interchangeable end effectors to execute diverse operations in an order-fulfillment workflow. Changing the equipped end effectors of mobile robots in a fleet can change an allocation of the mobile robots so as to adapt to changes in demand for operations of different types in the order-fulfillment workflow and/or to changes in execution of such operations independent of changes in demand. Thus, rather than acting as a purpose-built and static automation, the fleet acts as a multi-purpose and dynamic automation. Moreover, the fleet can be integrated with a human workforce such that the allocation of mobile robots within the fleet further adapts to changes in the human workforce. In at least some cases, mobile robots and human workers are effectively interchangeable in the order-fulfillment system. Furthermore, the order-fulfillment system can simplify adding and adjusting capacities of order-fulfillment centers as needed in response to demand. For example, base-form mobile robots can be reallocated not only to compensate for deficiencies in an order-fulfillment workflow at a single order-fulfillment center, but to accommodate changes in overall demand for operations between order-fulfillment centers within a geographically dispersed network.

The foregoing and other features of devices, systems, and methods in accordance with various embodiments of the present technology are further described below with reference to FIGS. 1-15. Although methods, devices, and systems may be described herein primarily or entirely in the context of bipedal, bimanual, mobile robots at order-fulfillment centers, other contexts are within the scope of the present technology. For example, suitable features of described methods, devices, and systems can be implemented in the context of managing non-legged mobile robots (e.g., wheeled mobile robots, tracked mobile robots, etc.), single-armed mobile robots, and mobile robots with more than two arms. Furthermore, suitable features of described methods, devices, and systems can be implemented in contexts other than order-fulfillment, such as contexts involving managing parts and supplies in manufacturing workflows. Finally, it should be understood, in general, that other methods, devices, and systems in addition to those disclosed herein are within the scope of the present technology. For example, methods, devices, and systems in accordance with embodiments of the present technology can have different or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Mobile Robots

Figure 2:
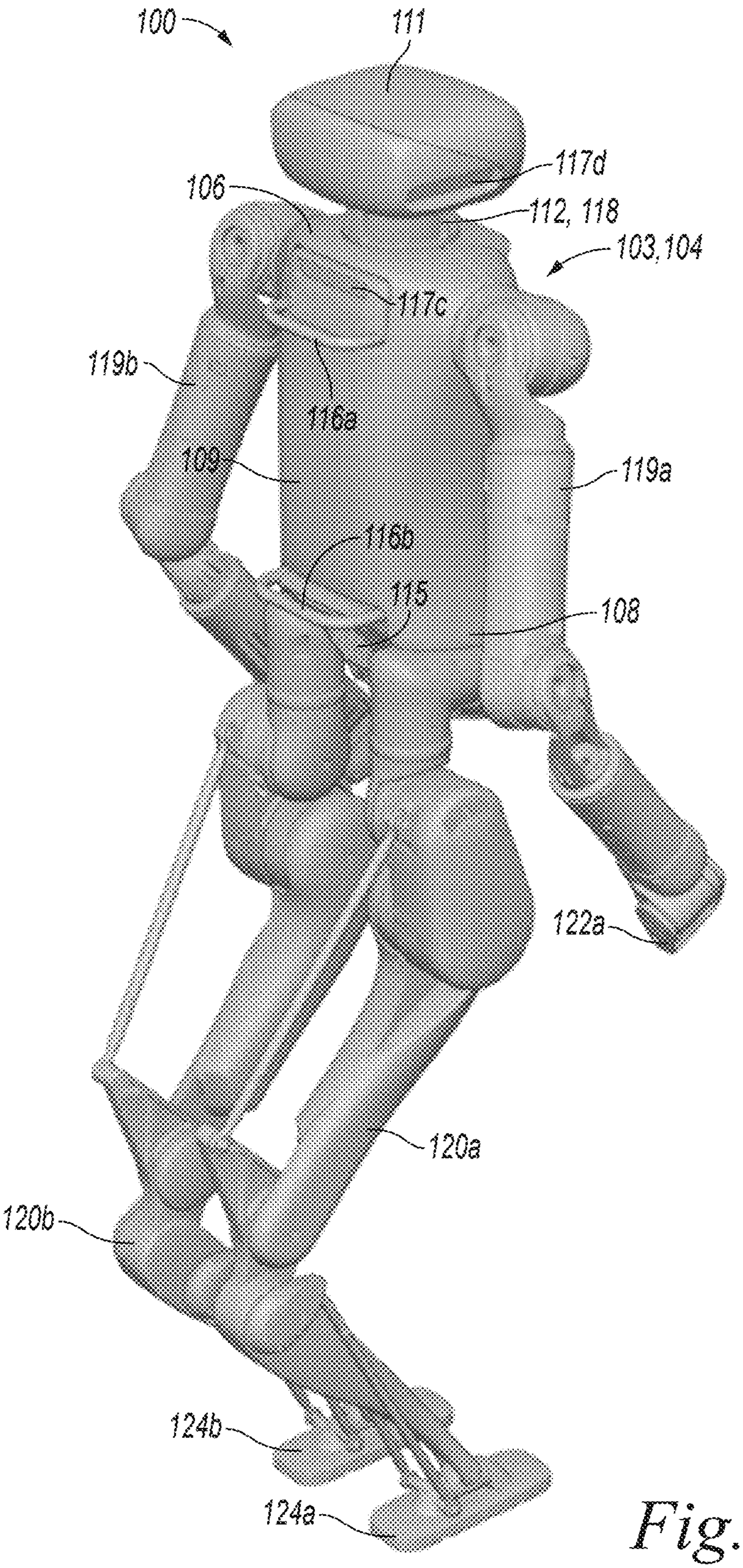
Figure 3:
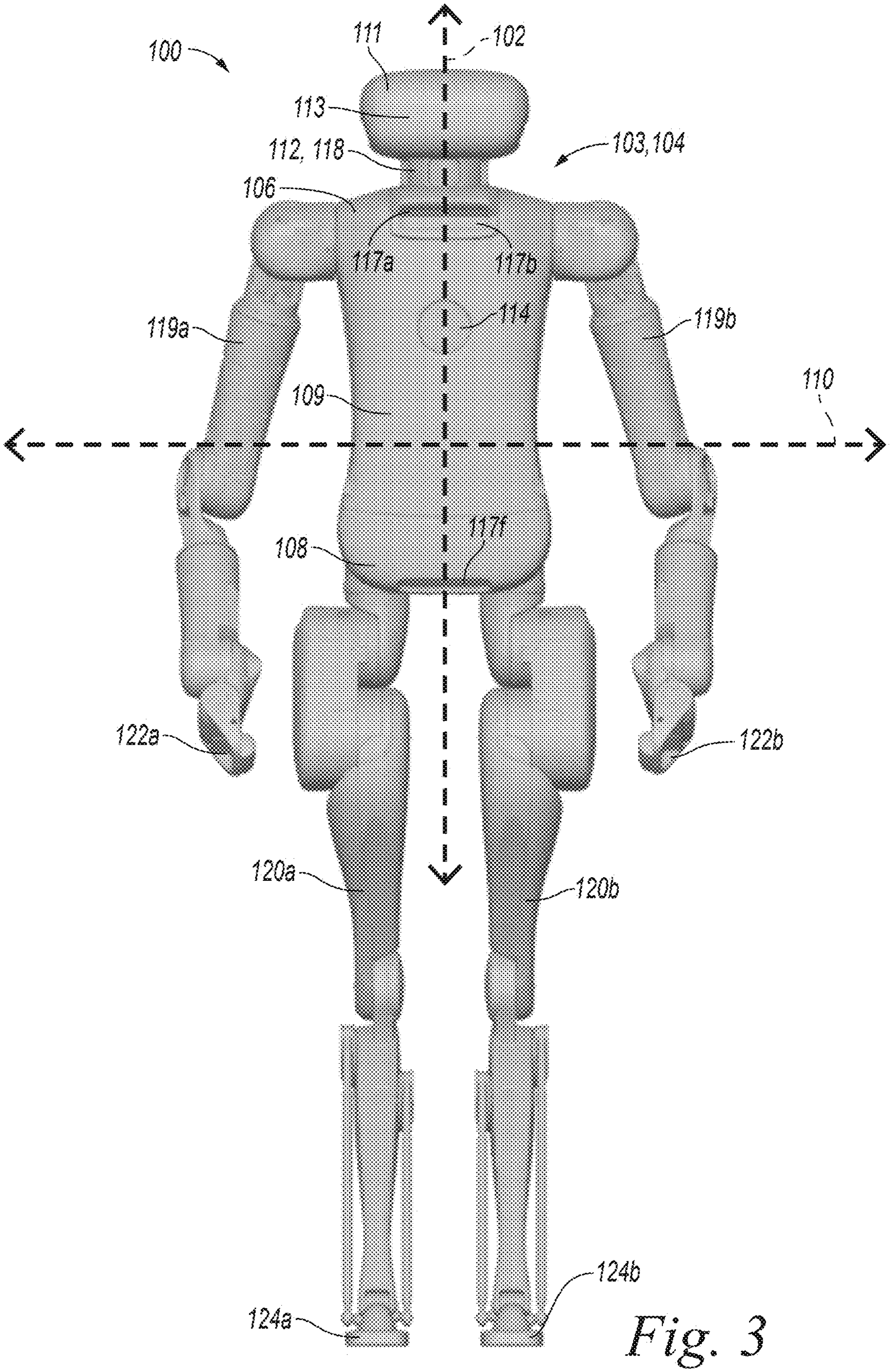

FIGS. 1 and 2 are different perspective views of a mobile robot 100 in accordance with at least some embodiments of the present technology. FIG. 3 is a front profile view of the mobile robot 100. As shown in FIGS. 1-3, the mobile robot 100 can include structures resembling human anatomy with respect to the features, positions, or other characteristics of such structures. In at least some cases, the mobile robot 100 defines a midsagittal plane 102 about which the mobile robot 100 is bilaterally symmetrical. In these and other cases, the mobile robot 100 can be configured for bipedal locomotion similar to that of a human. Counterparts of the mobile robot 100 can have other suitable forms and features. For example, a counterpart of the mobile robot 100 can have a non-humanoid form, such as a canine form, an insectoid form, an arachnoid form, or a form with no animal analog. Furthermore a counterpart of the mobile robot 100 can be asymmetrical or have symmetry other than bilateral. Still further, a counterpart of the mobile robot 100 can be configured for non-bipedal locomotion. For example, a counterpart of the mobile robot 100 can be configured for another type of legged locomotion (e.g., quadrupedal locomotion, hexapedal locomotion, octopedal locomotion, etc.) or non-legged locomotion (e.g., wheeled locomotion, continuous-track locomotion, etc.).

With reference again to FIGS. 1-3, the mobile robot 100 can include a centrally disposed body 103 through which other structures of the mobile robot 100 are interconnected. As all or a portion of the body 103, the mobile robot 100 can include a torso 104 having a superior portion 106, an inferior portion 108, and an intermediate portion 109 therebetween. The mobile robot 100 can define a transverse plane 110 from which the superior and inferior portions 106, 108 of the torso

104 are respectively superiorly and inferiorly spaced apart. The mobile robot 100 can further include a head 111 superiorly spaced apart from the torso 104. The mobile robot 100 can also include a neck 112 through which the head 111 is connected to the torso 104 via the superior portion 106 of the torso 104. The head 111 can have an anteriorly directed display 113. The mobile robot 100 can further include an anteriorly directed audio transmissive window 114 at the intermediate portion 109 of the torso 104, a posteriorly directed exhaust vent 115 at the inferior portion 108 of the torso 104, and handles 116*a*, 116*b* extending, respectively, posteriorly from the superior portion 106 of the torso 104 and posteriorly from the inferior portion 108 of the torso 104.

The mobile robot 100 can still further include elongate sensor bays 117 (individually identified as elongate sensor bays 117*a*-117*f*) carried by the torso 104 and the head 111. The sensor bay 117*a* can be at the anterior side of the superior portion 106 of the torso 104 and tilted inferiorly. The sensor bay 117*b* can be inferiorly adjacent to the sensor bay 117*a* at the anterior side of the superior portion 106 of the torso 104 and less tilted than the sensor bay 117*a*. The sensor bay 117*c* can be at the posterior side of the superior portion 106 of the torso 104 and posteriorly directed. The sensor bays 117*d*, 117*e* can be at opposite respective sides of the head 111 and can be directed in opposite respective lateral directions. The sensor bay 117*f* can be at the inferior portion 108 of the torso 104 and directed anteriorly and inferiorly toward a ground level in front of the mobile robot 100. The mobile robot 100 can further include a cylindrical sensor bay 118 at the neck 112. At the elongate sensor bays 117*a*-117*f* and at the cylindrical sensor bay 118, the mobile robot 100 can include perception sensors through which the mobile robot 100 can receive information about an environment in which it operates. The perception sensors can emit and/or receive optical, audio, electromagnetic, and/or other types of signals. Examples of suitable perception sensors include cameras (e.g., red-green-blue (RGB) cameras, infrared cameras, stereoscopic cameras, etc.), light detection and ranging (LIDAR) sensors, and sound navigation and ranging (SONAR) sensors. In a particular example, the mobile robot 100 includes cameras at the elongate sensor bays 117*a*-117*f* and a LIDAR sensor at the cylindrical sensor bay 118.

The mobile robot 100 can further include articulated appendages carried by the torso 104. Among these articulated appendages, the mobile robot 100 can include arms 119*a*, 119*b* and legs 120*a*, 120*b*. At articulations of the arms 119*a*, 119*b* and legs 120*a*, 120*b*, the mobile robot 100 can include joints and corresponding actuators, such as rotary actuators with motors and gearing (e.g., cycloidal gearing or strain-wave gearing). For clarity of illustration, the joints and actuators are not labeled with reference numbers in FIGS. 1-3. In at least some cases, the mobile robot 100 is configured to manipulate objects via the arms 119*a*, 119*b*, such as bimanually. In these and other cases, the mobile robot 100 can be configured to ambulate via the legs 120*a*, 120*b*, such as bipedally. The arms 119*a*, 119*b* and the legs 120*a*, 120*b* can define kinematic chains. In at least some cases, the kinematic chains corresponding to the arms 119*a*, 119*b* provide at least five degrees of freedom, such as exactly five or exactly six degrees of freedom. In these and other cases, the kinematic chains corresponding to the legs 120*a*, 120*b* can provide at least four degrees of freedom, such as exactly four, exactly five, or exactly six degrees of freedom. As parts of the arms 119*a*, 119*b*, the mobile robot 100 can include end effectors 122*a*, 122*b* at distalmost portions of the corresponding kinematic chains. Similarly, as parts of the legs 120*a*, 120*b*, the mobile robot 100 can include feet 124*a*, 124*b* at distalmost portions of the corresponding kinematic chains. In the illustrated embodiment, the end effectors 122*a*, 122*b* and the feet 124*a*, 124*b* are not articulated. In other embodiments, counterparts of the end effectors 122*a*, 122*b* and the feet 124*a*, 124*b* can be articulated, such as with one or more movable fingers or toes.

Figure 4:
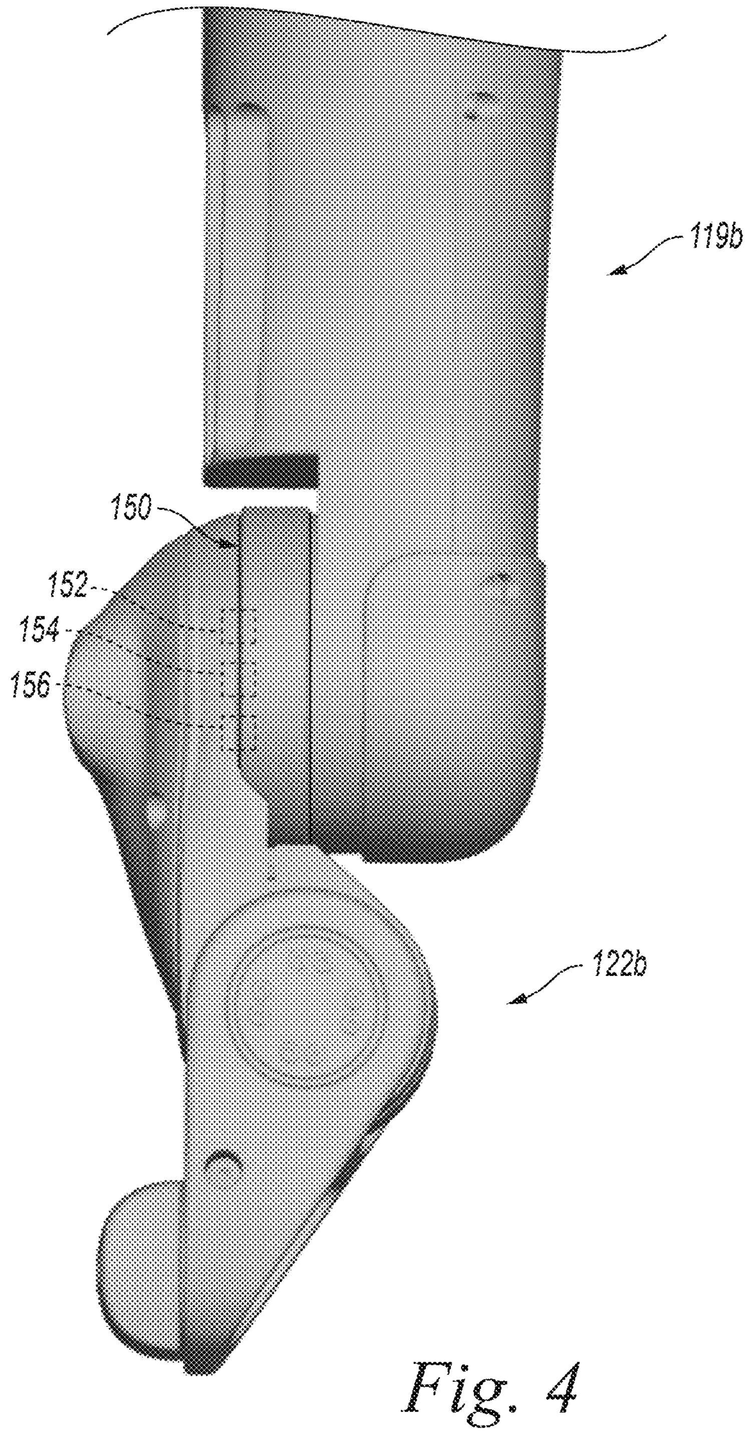
FIG. 4 is an enlarged side view of an end effector and a distal portion of an arm of the mobile robot of FIGS. 1-3.

The end effectors 122*a*, 122*b* can be interchangeable with other end effectors to change capabilities of the mobile robot 100. FIG. 4 is an enlarged side view of the end effector 122*b* and a distal portion of arm 119*b* showing connection details. As shown in FIG. 4, the end effector 122*b* and a distal portion of arm 119*b* can meet at an interface 150. In the illustrated case, the interface 150 is also a joint interface. In other cases, a counterpart of the interface 150 can be a fixed interface. With reference again to FIG. 4, the mobile robot 100 can include a mechanical connector 152 (shown schematically) at the interface 150 that provides a robust mechanical connection between the end effector 122*b* and the distal portion of arm 119*b* while still allowing the end effector 122*b* to be easily removed and replaced with a different end effector as needed. Examples of useful mechanical connectors for this purpose include bolts, clamps, latches, and magnets. For example, these and/or other components can be arranged to form a quick-release mechanism at the interface 150. In at least some cases, the mobile robot 100 also includes an electrical connector 154 (shown schematically) at the interface 150. Like the mechanical connector 152, the electrical connector 154 can be configured to allow for convenient attachment and detachment of the end effector 122*b*. Furthermore, the electrical connector 154 can allow for power transfer and/or information transfer. Examples of useful components of the electrical connector 154 include Molex connectors and coaxial connectors. Finally, the mobile robot 100 can include a vacuum connector 156 (shown schematically) at the interface 150. Examples of useful components of the vacuum connector 156 include rubber gaskets, o-rings, clamps, etc. The distal portion of arm 119*b* can include a vacuum line (not shown) that terminates distally at the vacuum connector 156. The end effector 122*b*, being a non-suction-end effector, can include a cap (not shown) at the vacuum connector 156. A different end effector with suction functionality can include a vacuum line that terminates proximally at the vacuum connector 156 and extends distally to a suction component (e.g., a suction gripper).

Figure 5A:
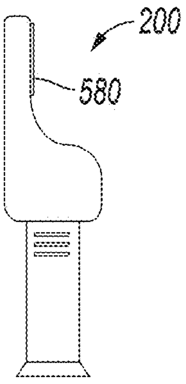
FIGS. 5A-5H are side profile views of different respective end effectors interchangeably deployable via the mobile robot of FIGS. 1-3.
Figure 5B:
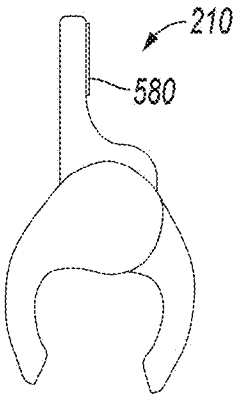
Figure 5C:
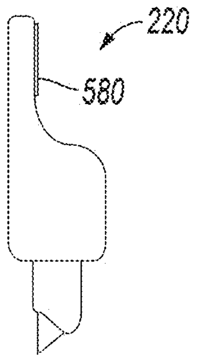
Figure 5D:
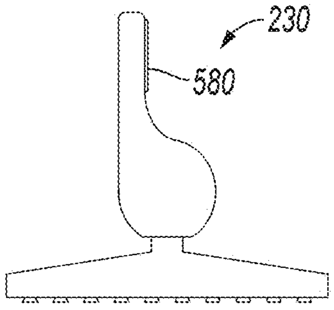
Figure 5E:
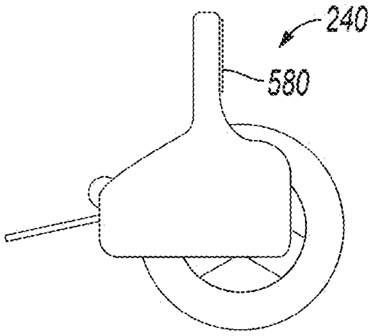
Figure 5F:
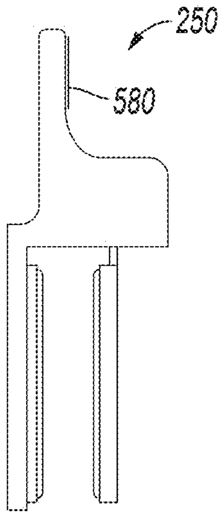
Figure 5G:
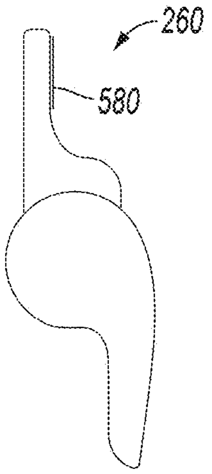
Figure 5H:
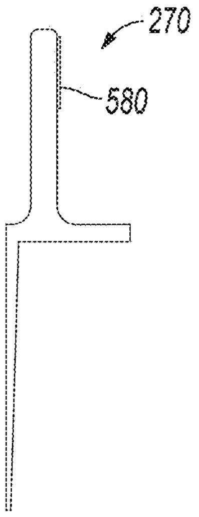

FIGS. 5A-5H are side profile views of different respective end effectors interchangeably deployable via the mobile robot 100. In particular, FIG. 5A shows a suction-wand end effector 200, FIG. 5B shows a pincer end effector 210, FIG. 5C shows a cutter end effector 220, FIG. 5D shows a suction-plate end effector 230, FIG. 5E shows a taper end effector 240, FIG. 5F shows a conveyor-plate end effector 250, FIG. 5G shows a paddle end effector 260, and FIG. 5H shows a scraper end effector 270. The end effectors shown in FIGS. 5A-5H can individually include a universal connector 280 (shown schematically) through which the end effectors are interchangeably connectable to the distal portion of the arm 119*b* of the mobile robot 100. The universal connector 280 can be configured to provide mechanical, power, communication, and vacuum connectivity as needed while still being conveniently detachable. Distal to the universal connector 280, the end effectors of FIGS. 5A-5H can include different respective functional components such that changing between the end effectors provides the mobile robot 100 with different capabilities. It should be understood that the functional components illustrated are merely a few examples. Numerous other functional components are possible. Indeed, the end effectors of FIGS. 5A-5H can be analogous to handheld tools available to human workers, with a similarly vast range of variability in functional components being possible. Furthermore only one example of chirality is shown for each of the end effectors of FIGS. 5A-5H. It should be understood that a complete set of interchangeable end effectors can also include end effectors corresponding to those shown in FIGS. 5A-5H, but of the opposite chirality.

Examples of Electrical and Computer Systems of Mobile Robots

Figure 6:
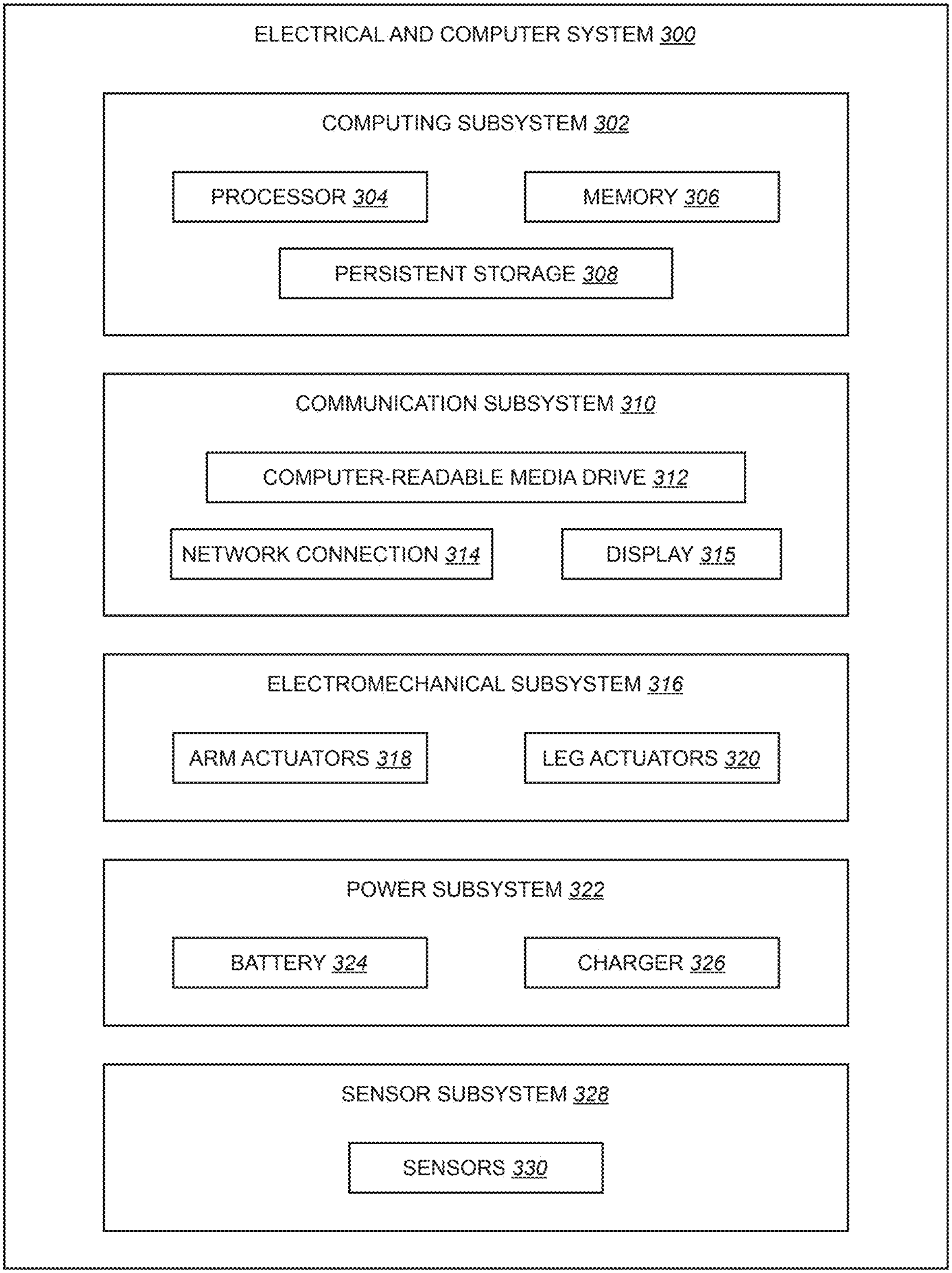
FIG. 6 is a block diagram depicting an electrical and computer system of the mobile robot of FIGS. 1-3.

Operations of the mobile robot 100, including data operations, movements, etc., and related operations described elsewhere in this disclosure can be implemented at least partially via the examples of electrical and computer systems disclosed in this section. FIG. 6 is a block diagram depicting an electrical and computer system 300 including electrical and computer components of the mobile robot 100. As shown in FIG. 6, the electrical and computer system 300 can include a computing subsystem 302. The computing subsystem 302 can include a processor 304, such as one or more general-purpose or special-purpose integrated circuits including digital logic gates for executing programs or for otherwise processing data. The computing subsystem 302 can further include memory 306, such as one or more integrated circuits for storing data in use. The memory 306 can include a multithreaded program, an operating system including a kernel, device drivers, etc. The computing subsystem 302 can further include persistent storage 308, such as a hard drive for persistently storing data. Examples of data that can be stored by the persistent storage 308 include diagnostic data, sensor data, configuration data, environmental data, and current-state data. The computing subsystem 302 can define a computer configured to manage, control, receive information from, deliver information to, and/or otherwise usefully interact with other components of the electrical and computer system 300.

The electrical and computer system 300 can further include a communication subsystem 310. The communication subsystem 310 can include a computer-readable media drive 312 for reading computer programs and/or other data stored on computer-readable media. As one example, the computer-readable media drive 312 can be a flash-memory drive. The communication subsystem 310 can further include a network connection 314 for connecting the electrical and computer system 300 to other devices and systems, such as other mobile robots and/or other computer systems. The network connection 314 can be wired or wireless and can be via the Internet, a Local Area Network (LAN), a Wide Area Network (WAN), BLUETOOTH®, Wi-Fi®, a cellular-phone network, etc. The network connection 314 can include networking hardware, such as routers, switches, transmitters, receivers, computer-readable transmission media, etc. The communication subsystem 310 can further include a display 315, such as the display 113 discussed above and/or other suitable hardware for communicating with a user. The mobile robot 100 can use the communication subsystem 310 for internal and/or external operations. Examples of these operations include interacting with systems that provide contextual information about the environment in which the mobile robot 100 operates and interacting with systems for changing operating conditions of the mobile robot 100.

The electrical and computer system 300 can further include an electromechanical subsystem 316. The electromechanical subsystem 316 can include arm actuators 318 and leg actuators 320 at joints of the arms 119*a*, 119*b* and legs 120*a*, 120*b*, respectively, as discussed above. In addition or alternatively, the electromechanical subsystem 316 can include other suitable components for implementing mechanical action within the mobile robot 100. As shown in FIG. 6, the electrical and computer system 300 can further include a power subsystem 322 including a battery 324 and a charger 326. The battery 324 can be a lithium-ion battery, a sodium-ion battery, a lead-acid battery, or a battery of another suitable type. The charger 326 can include a connector (not shown) compatible with a power source (e.g., a wall outlet, a charging station, etc.) and leads (not shown) extending between the connector and the battery 324. In at least some cases, the mobile robot 100 is configured to operate wirelessly while drawing power from the battery 324 and to recharge the battery 324 via the charger 326.

Finally, the electrical and computer system 300 can include a sensor subsystem 328 for capturing, providing, and/or analyzing information about the mobile robot 100 itself and/or an environment in which the mobile robot 100 operates. The sensor subsystem 328 can include sensors 330 such as the examples discussed above of sensors at the elongate sensor bays 117 and at the cylindrical sensor bay 118. At these and/or at one or more other suitable locations, the mobile robot 100 can include among the sensors 330, a vision sensor (e.g., a camera), a light sensor (e.g., a photoresistor), a sound sensor (e.g., a microphone), a location sensor (e.g., a Global Positioning System (GPS) sensor), a two-dimensional sensor, a three-dimensional sensor, and/or a proximity sensor, among other examples. Within the body 103 and/or at one or more other suitable locations, the mobile robot 100 can include among the sensors 330, an accelerometer, a gyroscope, a magnetometer, and/or a tilt sensor, among other examples. At the end effectors 122*a*, 122*b*, at the feet 124*a*, 124*b*, and/or at one or more other suitable locations, the mobile robot 100 can include among the sensors 330, a contact sensor and/or a force sensor, among other examples. In at least some cases, two or more different types of sensors are incorporated into a sensor assembly of the mobile robot 100. For example, an accelerometer, a gyroscope, and a magnetometer can be incorporated into an inertial measurement unit (IMU) through which the mobile robot 100 can determine parameters such as acceleration, angular velocity, and orientation. The mobile robot 100 can include an IMU within the torso 104, within the head 111, and/or at one or more other suitable locations.

At one, some, or all of the arm actuators 318, at one, some, or all of the leg actuators 320, and/or at one or more other suitable locations, the mobile robot 100 can include among the sensors 330, sensors that measure properties of the corresponding joints. Such properties can include position, orientation (e.g., yaw, pitch, and roll), applied force (e.g., torque), elevation, mass, velocity, and acceleration, among other examples. The measurements of these properties can be direct or indirect. As an example of direct sensing, the mobile robot 100 may sense a torque acting on a given joint via a torque sensor operably associated with the joint. As another example of direct sensing, the mobile robot 100 may sense a position of a given joint via an encoder operably associated with the joint. Any joint described herein should be construed as potentially including a torque sensor, encoder, and/or other suitable mechanism for direct sensing. As an example of indirect sensing, the mobile robot 100 may sense a position of a given one of the end effectors 122*a*, 122*b* or other component based on perception data corresponding to the component and other data corresponding to a reference. The mobile robot 100 can include one or more sensors in a sensor system, such as a vision system, a LIDAR system, a stereoscopic camera system, a SONAR system, etc. In at least some cases, the mobile robot 100 monitors itself and/or its environment in real-time or in near real-time. Moreover, the mobile robot 100 may use acquired sensor data as a basis for decision-making via the computing subsystem 302.

Components of the electrical and computer system 300 can be connected to one another and/or to other components of the mobile robot 100 via suitable conductors, transmitters, receivers, circuitry, etc. While the electrical and computer system 300 configured as described may be used to support operation of the mobile robot 100, it should be appreciated that the mobile robot 100 may be operated using devices of various types and configurations and that such devices may have various components and levels of responsibility. For example, the mobile robot 100 may employ individual computer systems and/or controllers to manage discrete aspects of its operations, such as an individual computer system or controller to perform computer vision operations, a separate computer system or controller to perform power management, etc. In some cases, the mobile robot 100 employs the electrical and computer system 300 to control physical aspects of the mobile robot 100 according to one or more designated rules encoded in software. For example, these rules can include minimums and/or maximums, such as a maximum degree of rotation for a joint, a maximum speed at which a component is allowed to move, a maximum acceleration rate for one or more components, etc. The mobile robot 100 may include any number of mechanical aspects and associated rules, which may be based on or otherwise configured in accordance with the purpose of and/or functions performed by the mobile robot 100. Furthermore, such rules and/or other control features of the electrical and computer system 300 can be embodied in one or more models and/or policies that dictate actions the mobile robot 100 should take to achieve goals in view of state information. As further discussed below in the context of software aspects of the electrical and computer system 300, these models and/or policies can be the products of machine-learning processes.

Software features of the electrical and computer system 300 and other systems described herein may take the form of computer-executable instructions, such as program modules executable by the computing subsystem 302. Generally, program modules include routines, programs, objects, components, data structures, or the like configured to perform particular tasks based on source data, which may be encrypted. Control scripts may be implemented via a suitable language, such as in C/C++ or Python®. The functionality of the program modules may be combined or distributed in various embodiments, including in cloud-based implementations. Furthermore, certain aspects of the present technology can be embodied in special purpose computers or data processors, such as in application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a LAN, a WAN, or the Internet. In a distributed computing environment, program modules and other components may be located in both local and remote memory storage and in other devices, which may be in communication via one or more wired or wireless communication channels.

Aspects of the present technology may be stored or distributed on tangible computer-readable media, which can include volatile or non-volatile storage components, such as magnetically or optically readable computer media, hardwired or preprogrammed chips (e.g., electrically erasable programmable read-only memory semiconductor chips), nanotechnology memory, or other computer-readable storage media. Alternatively, computer-implemented instructions, data structures, screen displays, and other data under aspects of the present technology may be distributed (encrypted or otherwise) over the Internet or over other networks (including wireless networks) on a propagated signal on a propagation medium (e.g., electromagnetic wave(s), sound wave(s), etc.) over a period of time. Furthermore, such data may be provided on an analog or a digital network and packet switched, circuit switched, or managed under another suitable scheme. The term computer-readable storage medium as used herein does not, however, encompass signals themselves (e.g., propagating signals) or transitory media. One of ordinary skill in the art will recognize that various components of the mobile robot 100 and other devices and systems described herein may communicate via any number of wired or wireless communication techniques and that elements of such devices and systems may be distributed rather than located in a single monolithic entity. Finally, electrical and computing aspects of systems in accordance with various embodiments of the present technology may operate in environments or according to processes other than the examples of environments and processes described herein.

Figure 7:
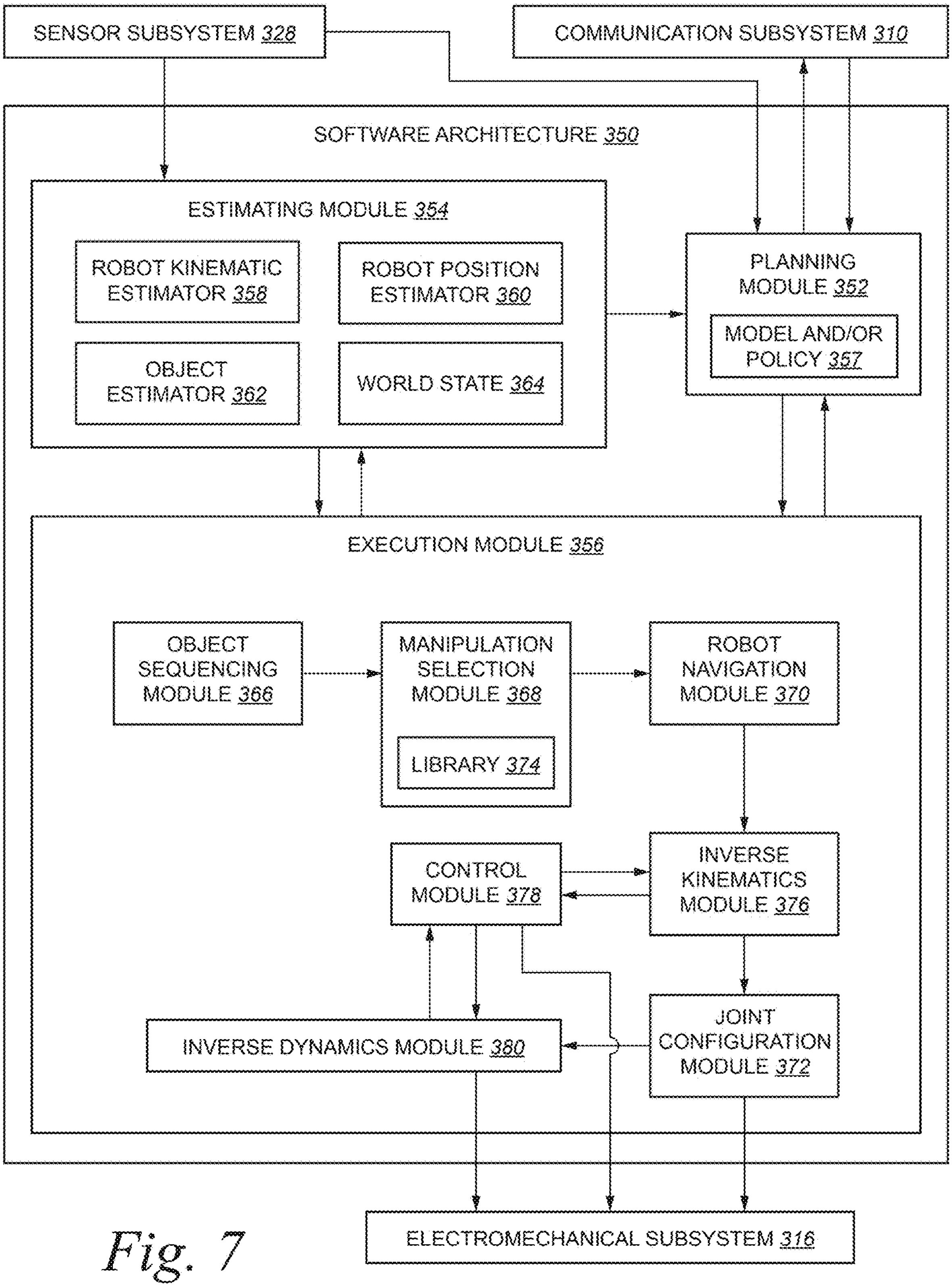
FIG. 7 is a block diagram depicting software architecture and associated portions of the electrical and computer system of FIG. 6.

FIG. 7 is a block diagram depicting software architecture 350 and associated portions of the electrical and computer system 300. The software architecture 350 can be within the memory 306 or otherwise operably associated with any or all of the various components of the electrical and computer system 300 as described above. With reference to FIGS. 6 and 7 together, the software architecture 350 can include a planning module 352, an estimating module 354, and an execution module 356 operably associated with one other. The planning module 352 can be configured to relay or to generate a plan corresponding to an objective for the mobile robot 100 (e.g., unload all objects on a shelf, retrieve an object from a first location and move the object to a second location, etc.). In at least some cases, the planning module 352 receives information from the sensor subsystem 328, the communication subsystem 310, and/or the estimating module 354 and relays or generates a plan based at least partially on the received information. For example, the planning module 352 may receive a command from a user via the communication subsystem 310 and relay the command as a plan. As another example, the planning module 352 may receive a command from a user via the communication subsystem 310 and generate a plan related to the command. As another example, the planning module 352 may generate a plan without receiving a command from a user, such as at a predetermined time and/or in response to information about a current state of the mobile robot 100 or the environment received via the sensor subsystem 328.

In at least some cases, the planning module 352 is configured to generate an appropriate plan from given input information based on a model and/or policy 357. The model and/or policy 357 can include a lookup table, a function, a neural network, and/or other software feature that correlates input information with all or part of a plan. The model and/or policy 357 can be generated via a reinforcement-learning process. Software tools available for implementing reinforcement-learning processes to generate the model and/or policy 357 include simulators such as MuJoCo (DeepMind Technologies Limited) and PyBullet, among others. Generating the model and/or policy 357 can include providing a simulator with specifications and selections. The specifications can include physical parameters (e.g., dimensions, weights, and kinematic parameters) of the mobile robot 100 and of objects in an environment in which the mobile robot 100 is expected to operate. The selections can include a selection of a reinforcement-learning algorithm, such as Q-Learning, Deep Q-Network, Policy Gradient, or Actor-Critic. The specifications and selections can also include a custom reward function that guides the development of the model and/or policy 357 via the reinforcement-learning algorithm. The reward function can be configured to reward desirable behaviors and to penalize undesirable behaviors given the specifications. Desirable and undesirable behaviors can include those that promote or undermine, respectively, goals other than the explicit goals of the reinforcement-learning algorithm. Examples of such goals include safety, efficiency, and legibility. Furthermore, the model and/or policy 357 need not be static. In at least some cases, the planning module 352 provides results of implementing the model and/or policy 357 back to the reinforcement-learning algorithm, which then refines the model and/or policy 357 based on these results.

The estimating module 354 can receive information from the sensor subsystem 328 and generate estimates in real-time or in near real-time to inform generating or executing a plan. The estimating module 354 can include a robot kinematic estimator 358, a robot position estimator 360, an object estimator 362, and a world state 364. The robot kinematic estimator 358 can generate an estimate of a current kinematic state of the mobile robot 100 (e.g., balanced, off-balance, walking, standing, etc.) and estimates of positions of individual joints of the mobile robot 100. The robot position estimator 360 can generate a current estimate of a position of the mobile robot 100 within an environment. This position can be a set of coordinates and can be based on perception information, GPS information, and/or other information received by or generated by the mobile robot 100. Perception information potentially relevant to the position of the mobile robot 100 includes, among other examples, information corresponding to distances between the mobile robot 100 and landmarks in an environment and information corresponding to fiducial markings (e.g., AprilTags) carried by or otherwise associated with the landmarks. This information can be detected, for example, via a three-dimensional sensor of the mobile robot 100 and/or via a camera of the mobile robot 100. Furthermore, information can move between components of the estimating module 354. For example, the world state 364 can receive information from the robot kinematic estimator 358, the robot position estimator 360, and the object estimator 362. In addition or alternatively, the object estimator 362 can receive information from the robot kinematic estimator 358 and the robot position estimator 360.

The object estimator 362 can generate a current estimate of an object (e.g., a tote) within an environment. In at least some cases, the estimate is a pose or other reference corresponding to a position and orientation of the object. As with the position of the mobile robot 100, the position of an object can be a set of coordinates and can be based on perception information, GPS information, and/or other information received by or generated by the mobile robot 100. Perception information potentially relevant to the position of an object includes, among other examples, information corresponding to distances between the object and the mobile robot 100, distances between the object and landmarks in an environment, and information corresponding to fiducial markings (e.g., AprilTags) carried by or otherwise associated with the object. This information can be detected, for example, via a three-dimensional sensor of the mobile robot 100 and/or via a camera of the mobile robot 100. In at least some cases, the object estimator 362 uses information (e.g., sensor poses) from the robot kinematic estimator 358 and/or the robot position estimator 360 to inform generation of object estimates. This can be useful, for example, when a fiducial or other landmark in an environment is not visible. Furthermore, the object estimator 362 can include a machine-learning model configured to generate useful object estimates from available information. For example, the object estimator 362 can include an object-recognition model, such as one based on Detectron2 (Facebook AI Research) with a Mask R-CNN implementation. The machine-learning model can be generated from human-annotated vision data, such as real and/or simulated images of objects from a perspective of the mobile robot 100. Finally, the object estimator 362 can be configured to update the world state 364 with object references and/or other information related to objects in an environment in which the mobile robot 100 operates.

The execution module 356 can be configured to receive a plan from the planning module 352 and estimates from the estimating module 354. The execution module 356 can include an object sequencing module 366, a manipulation selection module 368, a robot navigation module 370, and a joint configuration module 372. The planning module 352 can be configured to send a plan to the object sequencing module 366, to the manipulation selection module 368, to the robot navigation module 370, or to the joint configuration module 372 based on attributes of the plan. For example, when a plan includes explicit instructions for positions of the electromechanical subsystem 316, the planning module 352 can send the plan to the execution module 356 via the joint configuration module 372. As another example, when a plan does not involve manipulating an object, the planning module 352 can send the plan to the execution module 356 via the robot navigation module 370. As yet another example, when a plan concerns only one object and the object is remote to the mobile robot 100, the planning module 352 can send the plan to the execution module 356 via the manipulation selection module 368. As a final example, when a plan concerns multiple objects remote to the mobile robot 100, the planning module 352 can send the plan to the execution module 356 via the object sequencing module 366.

The object sequencing module 366 can receive one or more estimates from the estimating module 354 and can generate a sequence in which multiple objects are to be manipulated. For example, when the object sequencing module 366 receives a plan to unload a shelf, the object sequencing module 366 can query the estimating module 354 for current locations of objects on the shelf. The object sequencing module 366 can then assign the objects an order, convert the order into a queue, and pass the queue to the manipulation selection module 368. The manipulation selection module 368 can include a library 374 including two or more different models and/or policies that can be used to manipulate an object. For example, the manipulation selection module 368 may include one model or policy for one type of object and a different model or policy for another type of object. The manipulation selection module 368 can select a model or policy for a given object based on information, such as information about the object and/or information about the environment. The robot navigation module 370 can generate targets for different parts of the mobile robot 100 further to a plan or to a portion of a plan being executed. Examples of targets include positions of the feet 124*a*, 124*b* in the environment, positions of the end effectors 122*a*, 122*b* in the environment, etc. The robot navigation module 370 can update these targets continuously or near continuously based on information from the estimating module 354. The execution module 356 can further include an inverse kinematics module 376 that translates the targets from the robot navigation module 370 into joint configurations throughout the mobile robot 100.

The execution module 356 can also include a control module 378 that receives joint configurations from the inverse kinematics module 376 and generates joint parameters (e.g., positions, velocities, accelerations, etc.) to be executed by the mobile robot 100 via the electromechanical subsystem 316 to achieve these joint configurations. Through continuous or near-continuous communication with the inverse kinematics module 376, the control module 378 can modify the joint parameters to at least partially compensate for deviations as the mobile robot 100 executes the joint configurations. The inverse kinematics module 376 can send other joint configurations not subject to active control to the joint configuration module 372 directly. Similar to the control module 378, the joint configuration module 372 can generate joint parameters (e.g., positions, velocities, accelerations, etc.) to be executed by the mobile robot 100 to achieve joint configurations received from the inverse kinematics module 376 or from the planning module 352.

Finally, the execution module 356 can include an inverse dynamics module 380 that receives joint parameters from the control module 378 and from the joint configuration module 372. The inverse dynamics module 380 can track a desired wrench of the mobile robot 100 and its relationship with objects in the environment. In at least some cases, the inverse dynamics module 380 references a map of robot positions and wrenches to joint torques. Based at least partially on tracking these joint torques, the inverse dynamics module 380 can modify joint parameters to achieve a desired result. For example, the inverse dynamics module 380 may modify joint parameters from the control module 378 and from the joint configuration module 372 to maintain contact between the end effectors 122*a*, 122*b* and an object as the mobile robot 100 carries the object. The inverse dynamics module 380 can then send modified joint parameters to the electromechanical subsystem 316 for execution. For configurations that do not involve dynamic interaction with the environment, the control module 378 and the joint configuration module 372 can send joint parameters directly to the electromechanical subsystem 316 for execution.

With reference to FIGS. 6 and 7 together, suitable software components disclosed herein can be part of a distributed system or component thereof or implemented as one or more network-based services. For example, a compute cluster within a computing service may present computing or storage services or other types of services that employ any distributed computing systems described herein to clients as network-based services. In some embodiments, a network-based service may be implemented by a software or hardware system designed to support interoperable machine-to-machine interaction over a network. A network-based service may have a gateway described in a machine-processable format. Other systems may interact with the network-based service in a manner prescribed by the description of the network-based service's gateway. For example, the network-based service may define various operations that other systems may invoke, and may define a particular application programming interface (API) to which other systems may be expected to conform when requesting the various operations. An API refers to an interface or other communication protocol between a client and a server, such that if the client makes a request in a predefined format, the client should receive a response in a specific format or initiate a defined action. In the cloud provider network context, APIs may provide a gateway for customers to access cloud infrastructure by allowing customers to obtain data from and/or to cause actions within the cloud provider network, enabling the development of applications that interact with resources and services hosted in the cloud provider network. APIs can also enable different services of the cloud provider network to exchange data with one another.

In a distributed system, some or all of the software architecture 350 and other software described herein can be executed remotely from the mobile robot 100. For example, the mobile robot 100 can be configured to collect raw sensor data via the sensor subsystem 328 and to transmit some or all of this raw sensor data to a remote server in real-time or near real-time for processing. The mobile robot 100 can then receive joint commands and/or other products of this processing via communication with the server. In these and other cases, computing operations can be allocated among local and remote computing systems depending on factors such as computing demand, available computing resources, time sensitivity of computing products, etc. Moreover, even some or all of the sensors 330 can be remote from the mobile robot 100 in certain cases. For example, a remote sensor may track its reference frame relative to a local sensor of the mobile robot 100 and may communicate that reference frame with sensor data it collects at any given time. A server receiving the sensor data can then use the relationship between the reference frame of the local sensor and the reference frame of the remote sensor to generate output in a reference frame compatible with processes that rely on sensor data from the local sensor only. Alternatively, in a non-distributed system, all information processing and command execution can occur locally at the mobile robot 100 or other local hardware depending on the implementation.

Examples of Order-Fulfillment Systems

Figure 8:
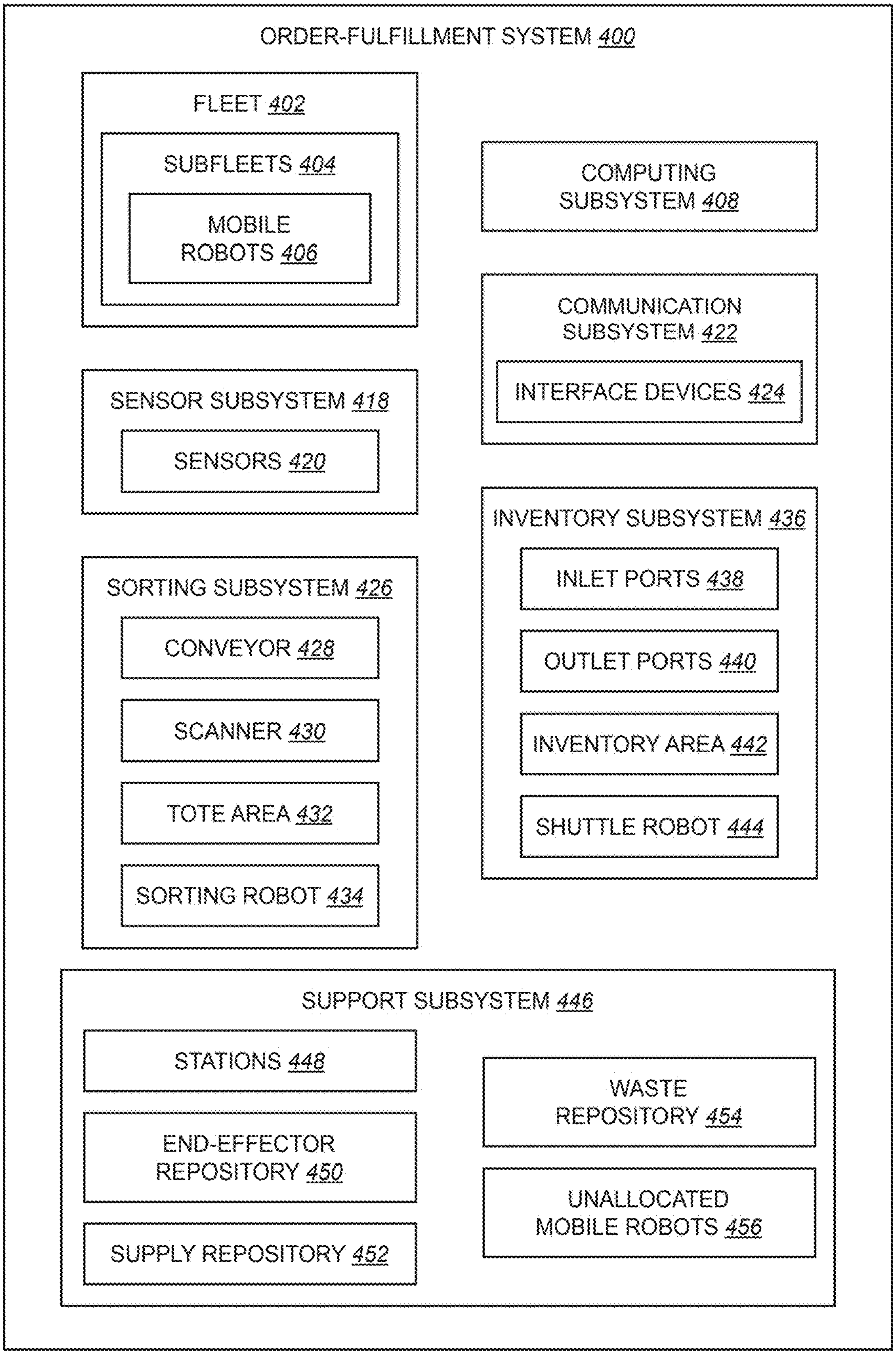
FIG. 8 is a block diagram depicting an order-fulfillment system in accordance with at least some embodiments of the present technology.
Figures 9, 10:
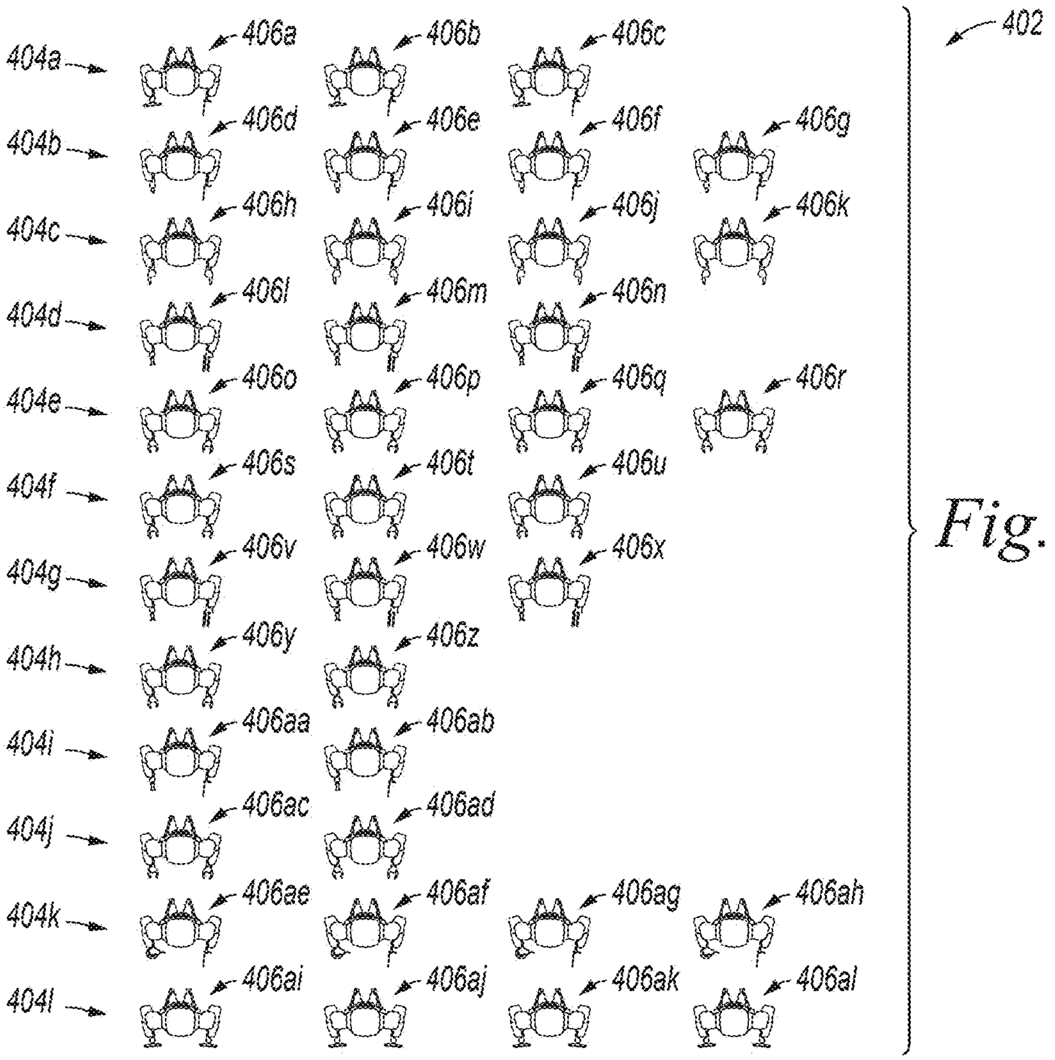
FIG. 9 is a top plan view of a fleet of mobile robots of the order-fulfillment system of FIG. 8.
FIG. 10 is a table showing left and right end-effector types within end-effectors sets deployed via mobile robots of different respective subfleets within the fleet of FIG. 9.

FIG. 8 is a block diagram depicting an order-fulfillment system 400 in accordance with at least some embodiments of the present technology. FIG. 9 is a top plan view of a fleet 402 of the order-fulfillment system 400. With reference to FIGS. 8 and 9 together, the order-fulfillment system 400 can include various subsystems, components, consumables, etc. that work together in support of an order-fulfillment workflow at an order-fulfillment center. In at least some cases, the order-fulfillment system 400 is configured to provide a comprehensive or nearly comprehensive automation solution for order fulfillment when deployed at a suitable order-fulfillment center. The order-fulfillment system 400 can include an innovative mix of stationary and mobile automation. Furthermore, the order-fulfillment system 400 can include flexibility in the mobile automation that allows for ready adaptation of the order-fulfillment system 400 to changes in demand for different operations within an order-fulfillment workflow, to changing from implementing one order-fulfillment workflow to implementing a different order-fulfillment workflow, and/or other to other types of changes. Furthermore, the order-fulfillment system 400 can be readily adaptable to changes in the capacity of ancillary systems, such as in the capacity of a human workforce that works alongside the fleet 402. The foregoing and/or other features of the order-fulfillment system 400 can be at least partially associated with the interchangeability of components of the mobile automation hardware within the order-fulfillment system 400.

In at least some cases, the fleet 402 provides most or all mobile automation capacity of the order-fulfillment system 400. As shown in FIG. 9, the fleet 402 can include subfleets 404 (individually identified as subfleets 404*a*-404*l*) of mobile robots 406 (individually identified as mobile robots 406*a*-406*al*). Some or all of the mobile robots 406*a*-406*al* can have features the same as or similar to the mobile robot 100 described above. Accordingly, the mobile robots 406*a*-406*al* can be legged and bimanual. Furthermore, the mobile robots 406*a*-406*al* can include interchangeable end effectors (not labeled in FIG. 9) the same as or similar to any of the end effectors described above. In the illustrated case, the mobile robots 406 are divided into 12 subfleets 404*a*-404*l*. The mobile robots 406*a*-406*al* within different subfleets 404*a*-404*l* can be assigned to different respective operation types within an order-fulfillment workflow. For example, the mobile robots 406*a*-406*c* of the subfleet 404*a* can be assigned to first operations of a first operation type while the mobile robots 406*d*-406*g* of the subfleet 404*b* are assigned to second operations of a different second operation type. The first and second operations can occur at the same or different areas of an order-fulfillment center.

FIG. 10 is a table showing left and right end-effector types within end-effectors sets deployed via the mobile robots 406*a*-406*al* of the different respective subfleets 404*a*-404*l* within the fleet 402. With reference to FIGS. 8-10 together, the end-effector set and constituent end effectors of the mobile robots 406*a*-406*al* of a given one of the subfleets 404*a*-404*l* can be of a set type and end-effector types, respectively, that correspond to an operation type or combination of operation types to which the mobile robots 406*d*-406*al* of the given one of the subfleets 404*a*-404*l* are assigned. Furthermore, the end-effector set and constituent end effectors of the mobile robots 406*a*-406*al* of a given one of the subfleets 404*a*-404*l* can be of a set type and end-effector types, respectively, that correspond to a context in which the assigned operation type is to be executed. Different operation types typically correspond to different set types, but this is not always the case. Furthermore, the mobile robots 406*a*-406*a*1 within a given one of the subfleets 404*a*-404*l* may be equipped with end-effector sets of the same set type, as shown, or of different set types. In the latter case, controlling the mix of mobile robots 406*a*-406*a*1 equipped with different set types within a given one of the subfleets 404*a*-404*l* can provide another layer of control over the dynamic operational capacity of the fleet 402 beyond controlling allocation of the mobile robots 406*a*-406*al* among the subfleets 404*a*-404*l*.

As an example, the mobile robots 406*a*-406*c* of the subfleet 404*a* can be assigned to a box-carrying operation type in the context of extracting sealed boxes from tightly packed pallets and moving the sealed boxes to a work table. These mobile robots 406*a*-406*c* can be equipped with end-effector sets 502*a* including the suction-plate end effector 230 and the scraper end effector 270, which can be well suited to this operation type and context. As another example, the mobile robots 406*d*-406*g* of the subfleet 404*b* can be assigned to a combination of box-unsealing and box-sliding operation types in the context of unsealing and sliding boxes on a work table. These mobile robots 406*d*-406*g* can be equipped with end-effector sets 502*b* including the cutter end effector 220 and the scraper end effector 270, which can be well suited to this combination of operation types and context. As another example, the mobile robots 406*h*-406*k* of the subfleet 404*c* can be assigned to a box-carrying operation type in the context of moving unsealed boxes from a work table to a staging table. These mobile robots 406*h*-406*k* can be equipped with end-effector sets 502*c* including two of the paddle end effectors 260, which can be well suited to this operation type and context. Similarly, the mobile robots 406*ac* and 406*ad* of the subfleet 404*j* can be assigned to a box-carrying operation type in the context of moving unsealed boxes from a staging table to a work table. These mobile robots 406*ac* and 406*ad* can also be equipped with the end-effector sets 502*c*.

As another example, the mobile robots 406*l*-406*n* of the subfleet 404*d* can be assigned to an item-carrying operation type in the context of moving items from boxes to a conveyor. These mobile robots 406*l*-406*n* can be equipped with end-effector sets 502*d* including the suction-wand end effector 200 and the conveyor-plate end effector 250, which can be well suited to this operation type and context. Similarly, the mobile robots 406*v*-406*x* of the subfleet 404*g* can be assigned to an item-carrying operation type in the context of moving items from totes to a conveyor. These mobile robots 406*v*-406*x* can also be equipped with the end-effector sets 502*d*. It should be understood that the term "item," as used herein, refers to the lowest manipulation level in an order-fulfillment workflow. This is often the level at which consumers can structure purchases. As another example, the mobile robots 406*o*-406*r* of the subfleet 404*e*, mobile robots 406*s*-406*u* of the subfleet 404*f*, and mobile robots 406*y* and 406*z* of the subfleet 404*h* can be assigned to a tote-carrying operation type in the respective contexts of moving totes between a put wall and a port, moving totes between a port and a staging table, and moving totes between a put wall and a staging table. These mobile robots 406*o*-406*r*, 406*s*-406*u*, 406*y*, and 406*z* can be equipped with end-effector sets 502*e* including two pincer end effectors 210, which can be well suited to this operation type and these contexts.

As yet another example, the mobile robots 406*aa* and 406*ab* of the subfleet 404*i* can be assigned to a combination of item-carrying and box-sliding operation types in the context of moving items from totes at a staging table to boxes at another staging table. These mobile robots 406*aa* and 406*ab* can be equipped with end-effector sets 502*f* including the suction-wand end effector 200 and the scraper end effector 270, which can be well suited to this combination of operation types and context. As another example, the mobile robots 406*ae*-406*ah* of the subfleet 404*k* can be assigned to a combination of box-sealing and box-sliding operation types in the context of sealing and moving order-containing boxes at a work table. These mobile robots 406*ae*-406*ah* can be equipped with end-effector sets 502*g* including the taper end effector 240 and the scraper end effector 270, which can be well suited to this combination of operation types and context. As another example, the mobile robots 406*ai*-406*al* of the subfleet 404*l* can be assigned to a box-carrying operation type in the context of gathering sealed boxes from work tables and stacking the sealed boxes on pallets. These mobile robots 406*ai*-406*al* can be equipped with end-effector sets 502*h* including two of the suction-plate end effectors 230, which can be well suited to this operation type and context. Numerous other examples of correspondences between set types, end-effector types, operations types, combinations of operation types, and contexts are also possible. In at least some cases, the process of developing models and/or policies for different operation types dictates the correspondences. For example, a reinforcement-learning process for a given operation type (e.g., box moving) can iterate through end-effector selections to arrive at a suitable set type for the operation type.

The order-fulfillment system 400 can further include a computing subsystem 408 having any suitable features discussed above for the computing system 302 of the electrical and computer system 300. Accordingly, the computing subsystem 408 can include a processor (not shown), memory (not shown), persistent storage (not shown), and/or other components for executing computing operations within the order-fulfillment system 400. Furthermore, as with the computing system 302, the computing subsystem 408 can be distributed. With reference again to FIGS. 8-10, the order-fulfillment system 400 can further include a sensor subsystem 418 including sensors 420 (individually identified as sensors 420*a*-420*h*). The sensors 420 can be configured to gather sensor data relevant to operation of the order-fulfillment system 400 and to transfer the sensor data to the computing subsystem 408 for processing. The order-fulfillment system 400 can also include a communication subsystem 422 having any suitable features discussed above for the communication system 310 of the electrical and computer system 300. Accordingly, the communication subsystem 422 can include a computer-readable media drive (not shown), a network connection (not shown), a display (not shown), and/or other components for executing communication operations within the order-fulfillment system 400. Furthermore, the communication subsystem 422 can include interface devices 424 (individually identified as interface devices 424*a*-424*e*). The interface devices 424*a*-424*c* can be stationary or mobile (e.g., handheld) devices through which human workers provide information to and/or retrieve information from the order-fulfillment system 400. Examples include monitors, touchscreens, scanners, and keyboards. In at least some cases, the electrical and computer system 300 described above with reference to FIGS. 6 and 7 is a component of the order-fulfillment system 400.

With further reference to FIG. 8, the order-fulfillment system 400 can include a sorting subsystem 426 including a conveyor 428, a scanner 430 (e.g., a tunnel scanner with six-sided barcode detection), a tote area 432, and a sorting robot 434. The conveyor 428 can be configured to receive items and to convey the items toward the tote area 432. The sorting robot 434 can be configured to sort items from the conveyor 428 into totes at the tote area 432. An example of the sorting subsystem 426 is the SURESORT® automated put wall available from OPEX Corporation (Moorestown, New Jersey) and with modifications in accordance with at least some embodiments of the present technology. The order-fulfillment system 400 can further include an inventory subsystem 436 including first ports 438 (individually identified as first ports 438*a*-438*c*), second ports 440 (individually identified as second ports 440*a*-440*c*), and an inventory area 442 therebetween. The inventory subsystem 436 can also include a shuttle robot 444 configured to move inventory totes between the first port 438, the inventory area 442, and the second port 440. An example of the inventory subsystem 436 is the INFINITY® automated storage and retrieval system also available from OPEX Corporation (Moorestown, New Jersey) and also with modifications in accordance with at least some embodiments of the present technology. In at least some cases, the sorting subsystem 426 and the inventory subsystem 436 are at least primarily stationary. Furthermore, the footprints of these systems in an order-fulfillment center may be difficult to change without significantly interfering with areas dedicated to other systems. The mobility and dynamic capacity of the subfleets 404*a*-404*l* can at least partially compensate for these limitations of the sorting subsystem 426 and the inventory subsystem 436.

The order-fulfillment system 400 can also include a support subsystem 446 including hardware configured to support operations of other portions of the order-fulfillment system 400. For example, the support subsystem 446 can include stations 448 (individually identified as stations 448*a*-448*e*) at which the mobile robots 406 can dock. In at least some cases, the stations 448 are configured to electrically charge batteries of the mobile robots 406 while the mobile robots 406 are docked. In addition or alternatively, the stations 448 can be configured to support the mobile robots 406 while end effectors of the mobile robots 406 are changed. Relatedly, the support subsystem 446 can include end-effector repositories 450 (individually identified as end-effector repositories 450*a*-450*c*) at which excess end effectors are stored when not deployed. In at least some cases, the end-effector repositories 450 store end effectors of several different types, such as at least 5, 10, or 20 different types. Furthermore, the end-effector repositories 450 can store end effectors of more than one chirality for at least some of these end-effector types. When the stations 448 are configured to support the mobile robots 406 during end-effector changes and in other cases, the end-effector repositories 450 can be positioned at or near the stations 448.

The support subsystem 446 can still further include a supply repository 452 including supplies of packaging (e.g., boxes, tape, etc.) and/or other consumable materials used in an order-fulfillment workflow. In a particular example, the supply repository 452 includes a shelving system. The support subsystem 446 can also include a waste repository 454 where used packaging and/or other waste materials generated in an order-fulfillment workflow can be collected for disposal or recycling. In a particular example, the waste repository 454 includes a bin. The support subsystem 446 can further include unallocated mobile robots 456 (individually identified as unallocated mobile robots 456*a*-456*q*). Some or all of the unallocated mobile robots 456*a*-456*q* can have features the same as or similar to the mobile robot 100 described above. Accordingly, the unallocated mobile robots 456*a*-456*q* can be legged and bimanual. Furthermore, the unallocated mobile robots 456*a*-456*q* can be configured to be equipped with interchangeable end effectors the same as or similar to any of the end effectors described above. As discussed below in detail, mobile robots of the order-fulfillment system 400 can be configured to transition from being among the mobile robots 406 of the subfleets 404 to being among the unallocated mobile robots 456 and vise versa.

Figure 11:
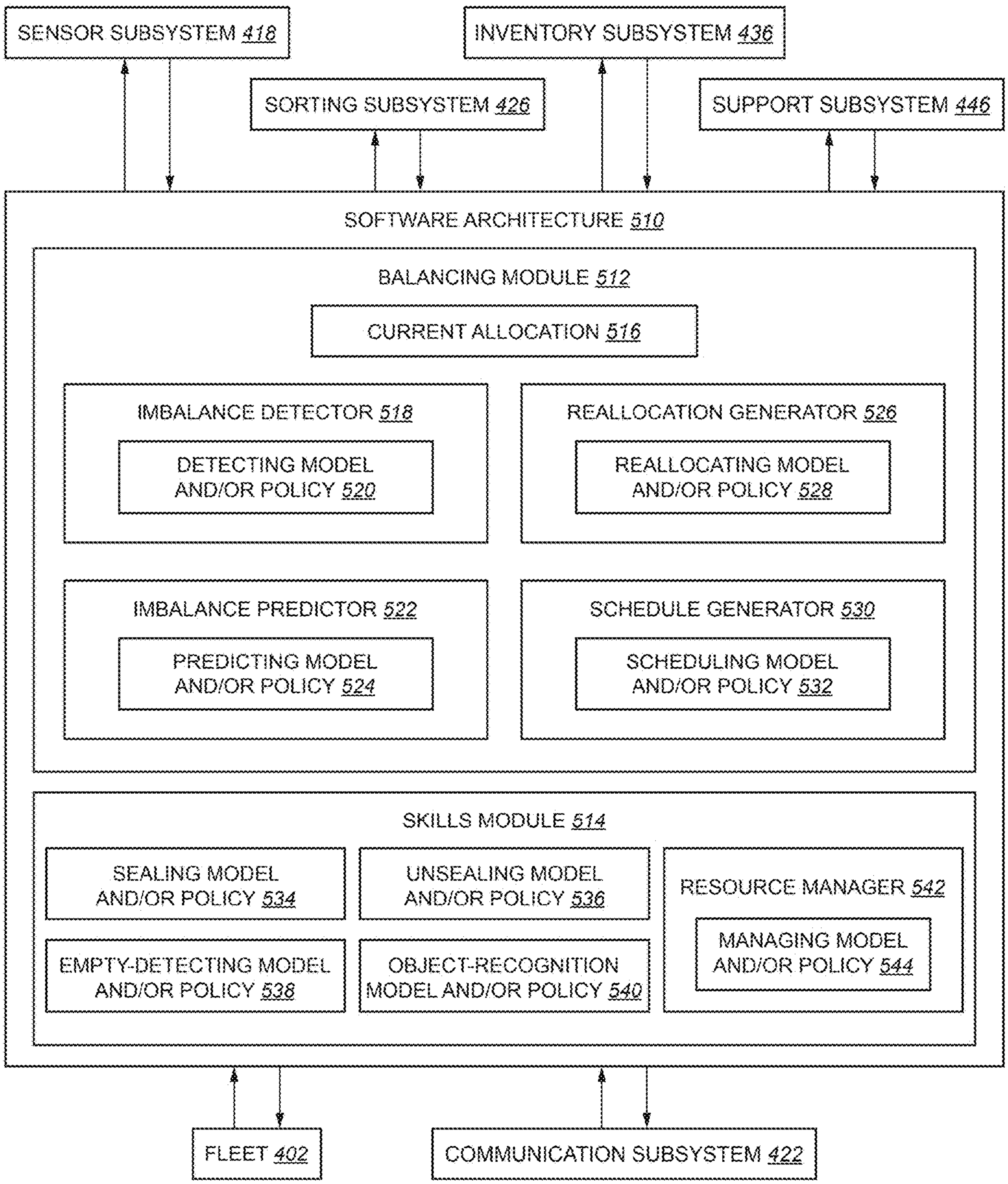
FIG. 11 is a block diagram depicting software architecture and associated portions of the order-fulfillment system of FIG. 8.

FIG. 11 is a block diagram depicting software architecture 510 and associated portions of the order-fulfillment system 400. With reference to FIGS. 8-11 together, the software architecture 510 can be within memory of the computing subsystem 408 or otherwise operably associated with any or all of the various components of the order-fulfillment system 400 as described above. Operations of the order-fulfillment system 400 and related operations described elsewhere in this disclosure can be implemented at least partially via the software architecture 510 and associated portions of the order-fulfillment system 400. Furthermore, the software architecture 510 can have any suitable features discussed above for the software architecture 350 of the electrical and computer system 300. Indeed, the software architecture 510 can include the software architecture 350. Moreover, the models and/or policies of the software architecture 510 can have any suitable features described above for the model and/or policy 357 of the planning model 352 of the software architecture 350. As shown in FIG. 11, the software architecture 510 can be configured to send and receive information from the fleet 402, the sensor subsystem 418, the communication subsystem 422, the sorting subsystem 426, the inventory subsystem 436, and the support subsystem 446. Accordingly, the software architecture 510 can have fleet-management and facilitate-management features.

The software architecture 510 can include a balancing module 512 and a skills module 514. The balancing module 512 can include a current allocation 516 of the mobile robots 406 within the fleet 402. In at least some cases, the balancing module 512 tracks the current allocation 516 via the mobile robots 406 and/or via the support subsystem 446. For example, a given one of the mobile robots 406*a*-406*al* can store assignment information corresponding to one of the subfleets 404*a*-404*l* to which the given one of the mobile robots 406*a*-406*al* is assigned at any given time. This assignment information can be updated when the given one of the mobile robots 406*a*-406*a*1 is reassigned to a different one of the subfleets 404*a*-404*l*. The given one of the mobile robots 406*a*-406*al* can communicate the reassignment to the balancing module 512. Alternatively or in addition, a portion of the support subsystem 446 associated with the reassignment can communicate the reassignment to the balancing module 512. The balancing module 512 can further include an imbalance detector 518 having a detecting model and/or policy 520. The imbalance detector 518 can be configured to determine an imbalance in the current allocation 516 based on information. The balancing module 512 can further include an imbalance predictor 522 having a predicting model and/or policy 524. The imbalance predictor 522 can be configured to determine a likely future imbalance in the allocation of the mobile robots 406 within the fleet 402 based on information. The balancing module 512 can still further include a reallocation generator 526 having a reallocating model and/or policy 528. The reallocation generator 526 can be configured to determine a reallocation of the mobile robots 406 within the fleet 402 responsive to a current or projected imbalance. Finally, the balancing module 512 can include a schedule generator 530 having a scheduling model and/or policy 532. The schedule generator 530 can be configured to generate schedules for human workers in concert with changes in an allocation of the mobile robots 406 within the fleet 402. Examples of detecting imbalances, predicting imbalances, generating reallocations, and generating schedules are provided below in the context of FIGS. 12-15.

The skills module 514 can include models and/or policies corresponding to skills that the mobile robot 100 may implement in connection with actions. For example, the skills module 514 can include a sealing model and/or policy 534, an unsealing model and/or policy 536, an empty-detecting model and/or policy 538, and an object-recognition model and/or policy 540. Examples of implementations of these models and/or policies are provided below in the context of FIGS. 12-15. Details of these models and/or policies may correspond to details provided above for the model and/or policy 357 in the context of the software architecture 350. Similarly, the skills module 514 can have suitable features similar to those described above for the library 374 in the context of the software architecture 350. The skills module 514 can also include a resource manager 542 having a managing model and/or policy 544 configured to allocate computing resources to different models and/or policies of the skills module 514 based on information about current or expected demand for different operations at an order-fulfillment center. For example, the skills module 514 can allocate more computing resources and/or higher priority processing to skills associated with bottleneck operations. This triaging of computing resources can be in concert with reallocating the mobile robots 406 to the bottleneck operations. For example, the triaging of computing resources via the resource manager 542 can occur at least primarily in response to short-term bottleneck while reallocating the mobile robots 406 occurs at least primarily in response to longer term bottlenecks.

Examples of Order-Fulfillment Methods

Figure 12:
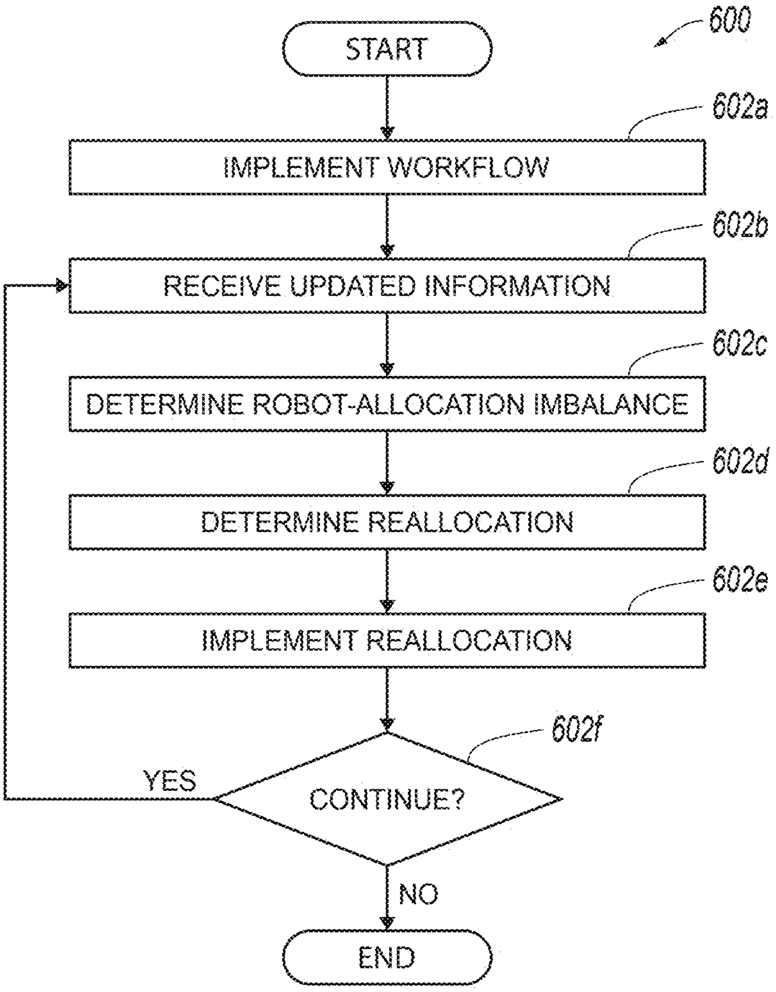
FIG. 12 is a block diagram depicting a method for using the order-fulfillment system of FIG. 8 in accordance with at least some embodiments of the present technology.
Figure 13:
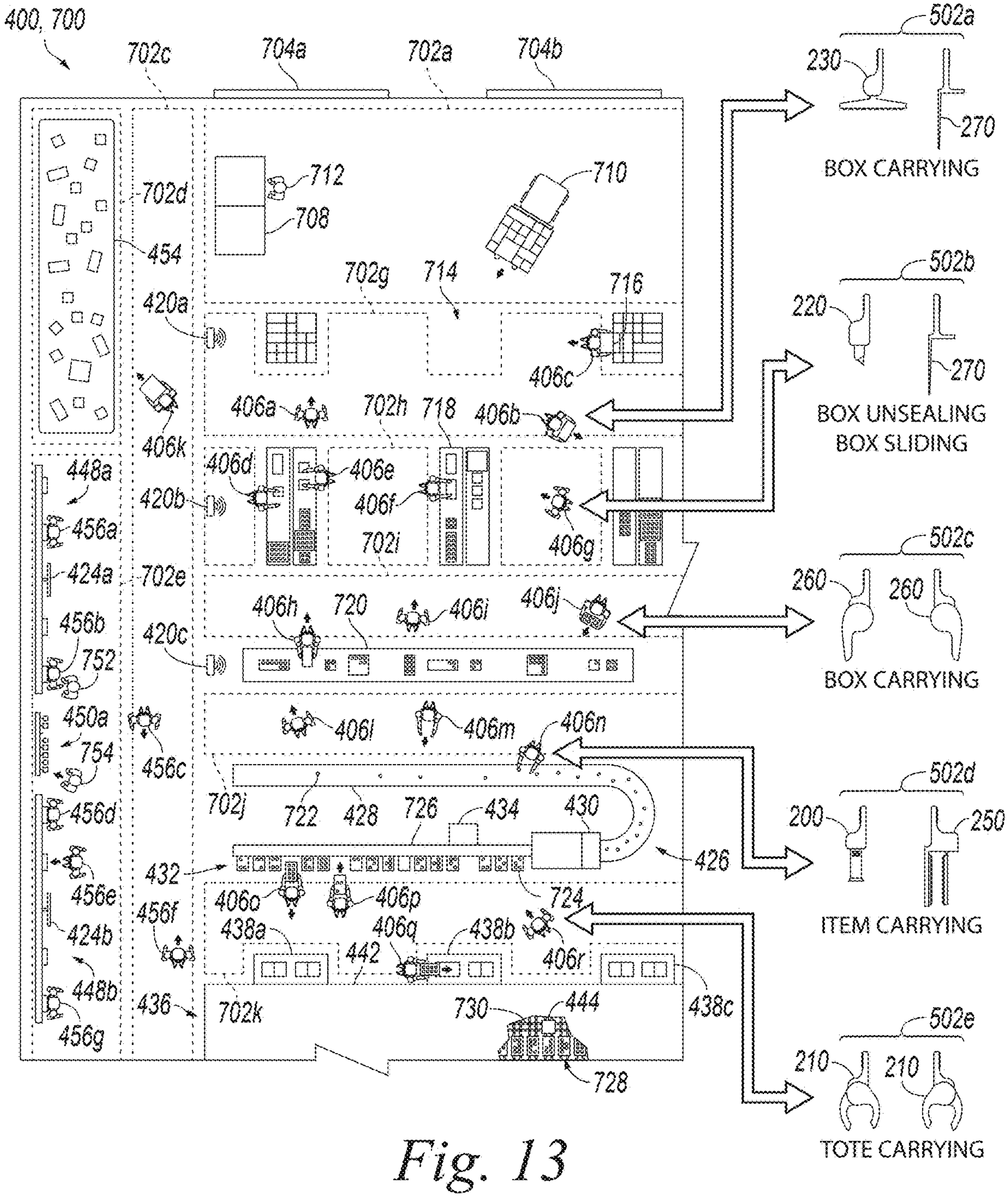
FIGS. 13 and 14 are respective portions of a top plan view of the order-fulfillment system of FIG. 8 deployed at an order-fulfillment center during execution of the method of FIG. 12.
Figure 14:
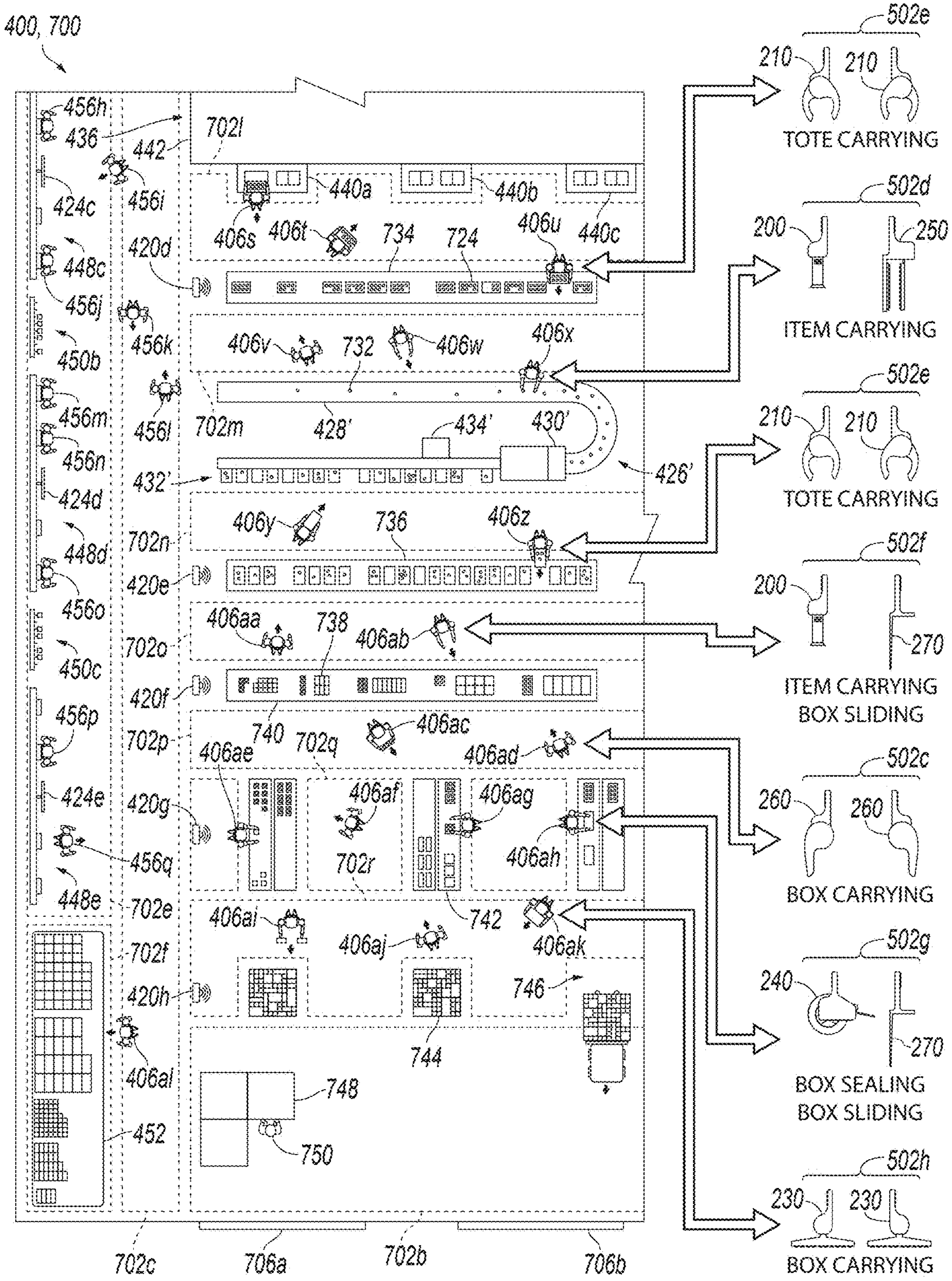

FIG. 12 is a block diagram depicting a method 600 for using the order-fulfillment system 400 in accordance with at least some embodiments of the present technology. The diagram includes blocks 602*a*-602*f* corresponding to different respective portions of the method 600. FIGS. 13 and 14 are respective portions of a top plan view of the order-fulfillment system 400 deployed at an order-fulfillment center 700 during execution of the method 600. Finally, FIG. 15 is a table showing an example of an order-fulfillment workflow implemented via the order-fulfillment system 400 at the order-fulfillment center 700 as part of the method 600. For clarity of illustration, the mobile robots 406*a*-406*al* are shown in FIGS. 13 and 14 with generic end effectors. FIG. 15 and the enlargements in the right-hand margins of FIGS. 13 and 14 show end-effector types and set types for the different respective subfleets 404*a*-404*l*.

With reference to FIGS. 8-15 together, the method 600 can include implementing the order-fulfillment workflow via the order-fulfillment system 400 at the order-fulfillment center 700 (block 602*a*). The order-fulfillment center 700 can include areas associated with different respective portions of the order-fulfillment workflow. These areas can include areas at which stationary portions of the order-fulfillment system 400 are situated, areas (e.g., workcells) in which mobile portions of the order-fulfillment system 400 operate, support areas, intake areas, outlet areas, and combinations thereof, among other examples. As shown in FIGS. 13 and 14, the order-fulfillment center 700 can include areas 702 (individually identified as areas 702*a*-702*r*). In the illustrated embodiment, areas 702*a*, 702*b* are dock areas, areas 702*c*-702*f* are support areas, and areas 702*g*-702*r* are workflow areas. Furthermore, areas 702*a*-702*g*, 702*i*-702*p*, and 702*r* are contiguous and areas 702*h* and 702*q* are discontiguous. The workflow areas 702*g*-702*r* alone or in suitable combinations can serve as workcells for the mobile robots 406*a*-406*al*. For example, mobile robots 406*a*-406*al* of a given one of the subfleets 406*a*-406*al* may be confined (e.g., via a virtual fence) to one or more of the areas 702*a*-702*r* relevant to an operation to which those mobile robots 406*a*-406*al* are assigned. When transitioning between subfleets 404, when performing support operations, and in other suitable situations, the mobile robots 406*a*-406*al* may also operate in one or more of the support areas 702*c*-702*f*. Associating the areas 702*a*-702*r* with operations of the mobile robots 406*a*-406*al* can be useful, for example, to facilitate the implementation of safety systems within the order-fulfillment center 700. The safety systems (e.g., physical barriers to human entry, alarms, shutdown protocols, etc.) at some of the areas 702*a*-702*r* may be different than those at others of the areas 702*a*-702*r*. In other embodiments, counterparts of the order-fulfillment center 700 can have other types of areas, other arrangements of areas, or even no counterparts of the areas 702*a*-702*r*. For example, in a counterpart of the order-fulfillment center 700, the mobile robots 406 may be free to move within any accessible area.

With reference again to the illustrated embodiment, the order-fulfillment center 700 can include incoming docks 704*a*, 704*b* at the area 702*a* and outgoing docks 704*a*, 704*b* at the area 702*b*. The order-fulfillment center 700 can receive goods for order fulfillment from manufacturers, wholesalers, or other sources in incoming pallets 708 (one labeled). Receiving the goods can include using a first forklift 710 to move the incoming pallets 708 from incoming trucks (not shown) to a staging region of the area 702*a*. A first human worker 712 can then remove outer packaging from the incoming pallets 708. The first forklift 710 can then move the incoming pallets 708 to incoming staging pads 714 (one labeled) between the area 702*a* and the area 702*g*. At the areas 702*g* and 702*h*, mobile robots 406*a*, 406*b*, 406*c* of the subfleet 404*a* can then move incoming boxes 716 (one labeled) from the incoming pallets 708 to first work tables 718 (one labeled). As discussed above, the box-carrying operation type in the context of extracting sealed boxes from tightly packed pallets and moving the sealed boxes to a work table can be compatible with the end-effector set 502*a*. For example, the suction-plate end effector 230 can be well-suited to firmly gripping the incoming boxes 716 when few surfaces of the incoming boxes 716 are exposed. The scraper end effector 270 can be well-suited to separating the incoming boxes 716 from one another and to providing secondary support to an incoming box 716 gripped via the suction-plate end effector 230.

At the area 702*h*, mobile robots 406*d*-406*g* of the subfleet 404*b* can then unseal the incoming boxes 716. As discussed above, the box-unsealing operation type can be compatible with the end-effector set 502*b*. For example, the mobile robots 406*d*-406*g* can use the cutter end effector 220 to cut tape on the incoming boxes 716 while the scraper end effector 270 provides support and/or a guide along which the cutter end effector 220 travels. The unsealing model and/or policy 536 can support this operation. Among other things, the unsealing model and/or policy 536 can process vision data from a given one of the mobile robots 406*d*-406*g* depicting an incoming box 716 on the first work table 718 as a basis for determining one or more cut paths for the cutter end effector 220, support positions for the scraper end effector 270, guide positions for the scraper end effector 270, and/or other planning and control parameters for unsealing the incoming box 716. The unsealing model and/or policy 536 can be generated from human-annotated vision data, such as real and/or simulated images of sealed boxes human annotated to show appropriate cut paths (e.g., along longitudinal centers of strips of tape, along seams between box flaps, along edges of box flaps, etc.) for unsealing. The computing subsystem 408 can use further vision data from the mobile robots 406*d*-406*g* indicating the success or failure of attempts to unseal incoming boxes 716 as training data to improve the unsealing model and/or policy 536.

The mobile robots 406*d*-406*g* can also slide the incoming boxes 716 on the first work tables 718 to better position the incoming boxes 716 for retrieval after unsealing. This can reduce or eliminate the likelihood of collisions between the mobile robots 406*d*-406*g* and the mobile robots 406*h*-406*k* operating immediately downstream from the mobile robots 406*d*-406*g* in the order-fulfillment workflow. The scraper end effector 270 alone can be well-suited to the sliding operation. In at least some cases, the mobile robots 406*d*-406*g* use perception information to determine when to stop sliding the incoming boxes 716. For example, the sliding can stop when a detected distance between a sliding incoming box 716 and another incoming box 716 or an edge of a first work table 718 is below a threshold. In these and other cases, the unsealing model and/or policy 536 can be configured to implement the sliding operation in addition to the unsealing operation.

Next, at the area 702*i*, mobile robots 406*h*-406*k* of the subfleet 404*c* can move unsealed incoming boxes 716 from the first work tables 718 to a first staging table 720. The end-effector set 502*c* can be well suited to this operation. It can be useful, for example, to avoid using suction when carrying unsealed boxes to avoid unintentionally gripping and displacing items. At the area 702*j*, the mobile robots 406*l*-406*n* of the subfleet 404*d* can move incoming items 722 (one labeled) from the unsealed incoming boxes 716 at the first staging table 720 to the conveyor 428. During this process, the mobile robots 406*h*-406*k* can gather vision data on the unsealed incoming boxes 716 to determine when the unsealed incoming boxes 716 are fully emptied of incoming items 722. In at least some cases, the empty-detecting model and/or policy 538 facilitates this operation. Among other things, the empty-detecting model and/or policy 538 can process vision data from a given one of the mobile robots 406*h*-406*k* depicting an incoming box 716 on the first staging table 720 and determine whether the incoming box 716 contains or does not contain incoming items 722. The training data used to generate the empty-detecting model and/or policy 538 can be human annotated, such as real and/or simulated images of unsealed incoming boxes 716 human annotated to indicate whether the incoming boxes contain or do not contain incoming items 722. When fully emptied, the mobile robots 406*h*-406*k* can move the unsealed incoming boxes 716 from the first staging table 720 to the waste repository 454 via the area 702*c* as shown with the mobile robot 406*k*.

The sorting subsystem 426 can advance the incoming items 722 through the scanner 430 via the conveyor 428. The computing subsystem 408 can receive identification information (e.g., stock keeping unit codes) for the incoming items 722 from the scanner 430. The computing subsystem 408 can then associate the identification information with identification information for totes 724 (one labeled) at the tote area 432. In some cases, the computing subsystem 408 uses stored information or sensed information about the totes 724 at the tote area 432 alone or together with information about the incoming items 722 to decide which totes 724 should receive which incoming items 722. For example, the computing subsystem 408 can be configured to implement a model and/or policy for selecting this association based at least partially on respective available space in and/or available weight capacity of the totes 724 at the tote area 432 and respective dimensions and/or weights of the incoming items 722. The respective available space in and/or weight capacity of the totes 724 can be determined based on current item-loads for the totes 724 and/or determined from sensor data on the totes 724 collected via a camera (not shown) of the sorting robot 434, a weight sensor (not shown) at the tote area 432, and/or another suitable sensor. The respective dimensions and/or weights of the incoming items 722 can be determined based on stored information associated with the corresponding identification information for the incoming items 722 (e.g., dimensions and weight for a product associated with a given stock keeping unit code) and/or determined from sensor data on the incoming items 722 collected via a camera (not shown)

of the sorting robot 434, a camera (not shown) of the scanner 430, a weight sensor (not shown) of the sorting robot 434, a weight sensor (not shown) of the scanner 430, and/or another suitable sensor. In addition to or instead of using capacity considerations, the computing subsystem 408 may associate the incoming items 722 with totes 724 based on an efficiency objective. For example, storing obscure items that sell infrequently together in the same totes 724 may be more efficient than mixing these items with fast-selling items. The sorting subsystem 426 can further include a track 726 (e.g., a cartesian track with vertical and horizontal rails) downstream from the scanner 430. The sorting robot 434 can traverse the track 726 to deliver the incoming items 722 to the appropriate totes 724 after scanning.

At the area 702*k*, the mobile robots 406*o*-406*r* of the subfleet 404*e* can move the totes 724 from the tote area 432 to the first ports 438 of the inventory subsystem 436. The mobile robots 406*o*-406*r* can also recognize when the totes 724 are ready to move. For example, the computing subsystem 408 can determine when the totes 724 are full (with respect to space and/or weight) via any of the approaches to determining available space and/or weight capacities of the totes 724 discussed above and then indicate this status to the mobile robots 406*o*-406*r*. The computing subsystem 408 can communicate the status of the totes 724 and instruct the mobile robots 406*o*-406*r* to move the totes 724 that are full directly (e.g., via a transmitted command) and/or indirectly (e.g, via a signal on the sorting subsystem 426 that the mobile robots 406*o*-406*r* detect independently). An advantage of the former includes enhanced coordination of the mobile robots 406*o*-406*r*. For example, the computing subsystem 408 can reduce or eliminate instances of more than one of the mobile robots 406*o*-406*r* attempting to move the same tote 724. An advantage of the latter includes enhanced compatibility with human workers. For example, the signal can be a light that illuminates when a given one of the totes 724 is ready to move. Both the mobile robots 406*o*-406*r* and human workers can detect this light and respond appropriately such that the mobile robots 406*o*-406*r* and human workers can readily substitute for one another as needed. In some cases, the mobile robots 406*o*-406*r* also move totes 724 from the inventory subsystem 436 to the tote area 432 to replace totes 724 moved from the tote area 432 to the inventory subsystem 436. For example, the inventory subsystem 436 can move totes 724 that are partially or fully depleted of items (e.g., by the item retrieval process discussed below) to the first ports 438 so that these totes 724 can be moved to the sorting subsystem 426 via the mobile robots 406*o*-406*r* for restocking. In other cases, the totes 724 removed from the tote area 432 are replaced in another suitable manner. For example, the support subsystem 446 can include a tote repository (not shown) including empty totes 724. In these and other cases, the 406*o*-406*r* can be assigned to move empty totes 724 from the tote repository to the tote area 432 as needed.

With reference again to the illustrated embodiment, the inventory subsystem 436 can move the totes 724 it receives at the first ports 438 to the inventory area 442 via the shuttle robot 444. The inventory subsystem 436 can include bays 728 (one labeled) at the inventory area 442 and a track 730 interconnecting the first ports 438, the second ports 440, and the bays 728. As with the track 726 of the sorting subsystem 426, the track 730 of the inventory subsystem 436 can be a cartesian track with vertical and horizontal rails. The computing subsystem 408 can coordinate movement of the totes 724 within the inventory area 442 via the shuttle robot 444 (typically numerous shuttle robots 444) to promote objectives, such as maintaining available bays 728 near the first ports 438, storing totes 724 containing fast-selling items at highly accessible portions of the inventory area 442, storing slow-selling items at less accessible (e.g. more consolidated and/or more remote) portions of the inventory area 442, etc. The computing subsystem 408 can update a database associating identification information for the bays 728 with identification information for the totes 724 to keep track of the respective locations of the totes 724 within the inventory area 442. In this way, the computing subsystem 408 can determine real-time locations of items within the inventory subsystem 436 via an item-to-tote-to-bay chain of associations.

With reference now to FIG. 14, the computing subsystem 408 can cause the inventory subsystem 436 to move the totes 724 to the second ports 440 in response to or in anticipation of customer orders for items within the totes 724. At this point, the items that were classified as incoming items 722 upstream from the inventory subsystem 436 can become outgoing items 732 (one labeled). At the area 702*l*, the mobile robots 406*s*-406*u* of the subfleet 404*f* can move the totes 724 from the second ports 440 to a second staging table 734 similar to the first staging table 720 discussed above. At the area 702*m*, the mobile robots 406*v*-406*x* of the subfleet 404*g* can move outgoing items 732 to fill customer orders from the totes 724 at the second staging table 734 to a conveyor 428' of another sorting subsystem 426' similar to the sorting subsystem 426. In at least some cases, the mobile robots 406*v*-406*x* collect and process images of the totes 724 to differentiate the outgoing items 732 from other items. For example, the mobile robots 406*v*-406*x* can use the object-recognition model and/or policy 540 for this purpose. As discussed above in the context of the software architecture 350, an example of a suitable object-recognition model and/or policy is one based on Detectron2 (Facebook AI Research) with a Mask R-CNN implementation. The object-recognition model and/or policy 540 can be generated from human-annotated vision data, such as real and/or simulated images of the totes 724 from the perspective of the mobile robots 406*v*-406*x* showing the outgoing items 732. In some cases, the computing subsystem 408 uses known information about contents of the totes 724 to facilitate the selection of outgoing items 732. For example, the computing subsystem 408 can seed the object-recognition model and/or policy 540 with information about the expected contents of a given tote 724 such that the mobile robots 406*v*-406*x* can more reliably differentiate outgoing items 732 to be gathered from the tote 724 from other items within the tote 724. The mobile robots 406*s*-406*u* can be equipped with the suction-wand end effector 200 and the conveyor-plate end effector 250 which can be useful, for example, to facilitate different gripping strategies for different types of outgoing items 732.

After all outgoing items 732 in a tote 724 at the second staging table 734 for filling current or anticipated customer orders have been removed, the mobile robots 406*s*-406*u* can move the tote 724 back into the inventory subsystem 436 via the second ports 440. Alternatively or in addition, when one of the totes 724 is completely emptied, the mobile robots 406*s*-406*u* can move that tote to a tote repository as discussed above. Downstream from the second staging table 734, the sorting subsystem 426' can operate in a manner similar to the manner in which the sorting subsystem 426 operates except with the totes 724 at the tote area 432' organizing the outgoing items 732 by order rather than by inventory considerations. Thus, the computing subsystem 408 can identify a given tote 724 at the tote area 432' as ready to be retrieved when an order corresponding to the tote

724 is complete rather than when the tote 724 reaches a space and/or weight capacity limit. In at least some embodiments, the sorting subsystem 426' moves excess outgoing items 732 to one or more of the totes 724 at the tote area 432' for reintroduction into the inventory subsystem 436 as needed. An outgoing item 732 can be an excess item, for example, when an order containing the item is canceled after an inventory retrieval process for the item is initiated or when one of the mobile robots 406*v*-406*x* retrieves the item mistakenly.

At the area 702*n*, the mobile robots 406*y* and 406*z* of the subfleet 404*h* can move the totes 724 from the tote area 432' to a third staging table 736. At the area 702*o*, the mobile robots 406*aa* and 406*ab* of the subfleet 404*i* can move outgoing items 732 from the totes 724 at the third staging table 736 to outgoing boxes 738 (one labeled) at a fourth staging table 740. In at least some cases, the mobile robots 406*y* and 406*z* select from among several different sizes of the outgoing boxes 738 at the fourth staging table 740 depending on properties of the outgoing items 732. After placing an outgoing item 732 in one of the outgoing boxes 738, the mobile robots 406*y* and 406*z* can associate an identification of the outgoing item 732 with an identification of the outgoing box 738 in which the outgoing item 732 was placed. The outgoing box 738 can then also be associated with a customer order to which the outgoing item 732 belongs. In at least some cases, the outgoing boxes 738 include a barcode, a QR code, or another marking that the mobile robots 406*y* and 406*z* can detect and process to gather identification information. When ready for sealing, the mobile robots 406*y* and 406*z* can slide the outgoing boxes 738 to a different portion of the fourth staging table 740 (e.g., using the scraper end effector 270) to facilitate retrieval.

At the area 702*p*, the mobile robots 406*ac* and 406*ad* of the subfleet 404*j* can move the outgoing boxes 738 ready for sealing from the fourth staging table 740 to second work tables 742 (one labeled). At the area 702*q*, the mobile robots 406*ae*-406*ah* of the subfleet 404*k* can slide the outgoing boxes 738 to relatively uncluttered regions of the second work tables 742 (e.g., using the scraper end effector 270), seal the outgoing boxes 738 at that region, and then slide the outgoing boxes 738 to another region of the second work tables 742 to facilitate retrieval. In at least some cases, the sealing model and/or policy 534 controls the sealing operation. Among other things, the sealing model and/or policy 534 can process vision data from a given one of the mobile robots 406*ae*-406*ah* depicting an outgoing box 738 on a second work table 742 as a basis for determining one or more taping paths for the taper end effector 240, support positions for the scraper end effector 270 (e.g., while holding down flaps of the outgoing box 738), guide positions for the scraper end effector 270, and/or other planning and control parameters for sealing the outgoing box 738. The sealing model and/or policy 534 can be generated from human-annotated vision data, such as real and/or simulated images of unsealed boxes with collapsed flaps human annotated to show appropriate taping paths (e.g., along seams of the unsealed boxes, along edges of flaps of the unsealed boxes, etc.) for sealing.

At the area 702*r*, the mobile robots 406*ai*-406*al* of the subfleet 404*l* can move the sealed outgoing boxes 738 from the second work tables 742 to outgoing pallets 744 (one labeled) at outgoing staging pads 746 (one labeled). The mobile robots 406*ai*-406*al* can also be assigned to retrieving makeup outgoing boxes 738 from the supply repository 452 and to moving the makeup outgoing boxes 738 to the fourth staging table 740 as needed to replenish supplies of the outgoing boxes 738 available to the mobile robots 406*aa* and 406*ab*. Finally, at the area 702*b*, the outgoing pallets 744 can be moved using a second forklift 748 to a staging region of the area 702*b*. A second human worker 750 can then apply outer packaging to the outgoing pallets 744. When trucks (not shown) are available to retrieve the outgoing pallets 744, the second forklift 748 can move the outgoing pallets 744 to the trucks via the outgoing docks 706*a*, 706*b*. FIG. 15 summarizes the sequence of the different portions of the order-fulfillment workflow described above as well as the primary areas 702 of the order-fulfillment center 700 at which these portions occur and the primary manipulation level, operation type, automation, and subfleet associated with these portions of the order-fulfillment workflow. It should be understood that this order-fulfillment workflow is merely one example. Numerous other innovative workflows involving stationary and mobile automation with the latter being dynamic are possible in accordance with various embodiments of the present technology.

With reference again to FIG. 12, implementing the order-fulfillment workflow in the method 600 can include executing first operations of a first operation type via a plurality of first mobile robots of a first one of the subfleets 404 during a first time period and at a first one of the areas 702. Similarly, implementing the order-fulfillment workflow in the method 600 can include executing second operations of a second operation type via a plurality of second mobile robots of a second one of the subfleets 404 during the first time period and at a second one of the areas 702. The first and second operations can be operations to which the plurality of first mobile robots and the plurality of second mobile robots are respectively assigned via the computing subsystem 408. Furthermore, the first and second operation types can be different. For example, the first operation type can be one of tote moving, item moving, box moving, box unsealing, and box sealing while the second operation type is a different one of these operation types. In a particular example, the first operation type is tote moving while the second operation type is item moving. The first and second ones of the areas 702 can also be different. For example, the first and second ones of the areas 702 can be upstream and downstream, respectively, from the inventory subsystem 436 within the order-fulfillment workflow. In addition or alternatively, the first and second ones of the areas 702 can be upstream and downstream, respectively, from the sorting subsystem 426 within the order-fulfillment workflow.

During the first time period, the first mobile robots can be respectively equipped with end effectors of a first end-effector type while the second mobile robots are respectively equipped with end effectors of a different second end-effector type. In at least some cases, the first end-effector type is a non-suction end-effector type while the second end-effector type is a suction end-effector type. In addition or alternatively, the first end-effector type can have a first number of degrees of freedom while the second end-effector type has a second number of degrees of freedom different than the first number of degrees of freedom. Furthermore, the first mobile robots can be respectively equipped with end-effector sets of a first set type while the second mobile robots are respectively equipped with end-effector sets of a different second set type. The first end-effector type and the first set type can correspond to the first operation type. For example, the first set type can be a bimanual set type including constituent end-effector types complementary with one another for execution of operations of the first operation type. Similarly, the second end-effector type and set type can correspond to the second operation type. For example, the second set type can be a bimanual set type including constituent end-effector types complementary with one another for execution of operations of the second operation type. Within the first and second set types, the constituent end-effector types can be the same or different. Furthermore, the constituent end-effector types of the first set type can be non-suction end-effector types while one or both of the constituent end-effector types of the second set type are suction end-effector types. In addition or alternatively, the constituent end-effector types of the first set type can have a first combined number of degrees of freedom while the constituent end-effector types of the second set type have a different second combined number of degrees of freedom.

As shown in FIG. 12, the method 600 can further include receiving updated information (block 602*b*) for the order-fulfillment workflow. This can occur, for example, at the computing subsystem 408. The updated information can be information relevant to demand for different operation types within the order-fulfillment workflow. As an example, the updated information can include queue information related to queues of items, boxes, totes, pallets, etc. awaiting advancement within the order-fulfillment workflow. In these and other cases, at least some of the sensors 420*a*-420*h* can be queue sensors operably associated with different respective queues of the order-fulfillment workflow. The computing subsystem 408 can receive queue information from the sensors 420, such as in real-time or near real-time. As examples, the sensor 420*a* can monitor a queue of the incoming pallets 708 at the incoming staging pads 714, the sensor 420*b* can monitor a queue of unsealed incoming boxes 716 at the first work tables 718, the sensor 420*c* can monitor a queue of incoming boxes 716 awaiting item retrieval at the first staging table 720, the sensor 420*d* can monitor a queue of totes 724 awaiting item retrieval at the second staging table 734, the sensor 420*e* can monitor a queue of totes 724 awaiting item retrieval at the third staging table 736, the sensor 420*f* can monitor a queue of unsealed outgoing boxes 738 at the fourth staging table 740, the sensor 420*g* can monitor a queue of unsealed outgoing boxes 738 at the fourth staging table 740, and the sensor 420*h* can monitor a queue of outgoing pallets 744 at the outgoing staging pads 746. Other examples of queue sensing are also possible.

The queue sensors can have a variety of suitable forms. For example, at least some of the queue sensors can be vision sensors that gather vision data for processing via a queue-measuring model and/or policy (not shown) of the software architecture 510. Additional or alternative queue sensors can be mobile rather than stationary, such as carried by the mobile robots 406, by aerial surveillance drones (not shown), and/or by another mobile platform at the order-fulfillment center 700. Furthermore, additional or alternative queue sensors can be non-vision sensors. As an example, various staging tables, work tables, racks, etc. within the order-fulfillment center 700 can include contact and/or weight sensors that detect the presence or absence of queued objects. Queue information can also come from non-sensor sources. For example, the sorting systems 426, 426' can gather queue information as a byproduct of sorting information. For example, when sorting is complete for a given tote 724, the tote 724 can be added to a queue of totes 724 ready for retrieval. As another example, the updated information can include order information related to orders to be fulfilled via the order-fulfillment system 400. Still other examples of updated information include updated utilization information, updated throughput information, and updated backlog information, such as from the mobile robots 406, the sorting systems 426, 426', and/or other portions of the order-fulfillment system 400 relevant to demand for different operation types within the order-fulfillment workflow.

The method 600 can further include determining a current or predicted robot-allocation imbalance (block 602*c*) and determining a responsive reallocation of at least some of the mobile robots 406 among the subfleets 404 (block 602*d*). These operations can occur via the computing subsystem 408 and be based at least partially on the updated information. In some cases, the updated information is actionable for changing capacities of the order-fulfillment system 400 for different operation types within the order-fulfillment workflow with little or no further processing. Certain updated information can have a relatively direct correspondence with a need for increasing or decreasing such capacities. In other cases, the computing subsystem 408 processes the updated information to generate more actionable information. In an example of the former, the computing subsystem 408 may determine that capacity is suboptimally low for a given operation type when the number of queued objects awaiting operations of that operation type is relatively high. In another example of the former, the computing subsystem 408 may determine that capacity is suboptimally high for a given operation type when average utilization for mobile robots assigned to operations of that operation type is relatively low. As an example of the latter, the computing subsystem 408 can receive updated order information, process the updated order information, and determine a predicted robot-allocation imbalance based at least partially on a result of this processing. Thus, determining the robot-allocation imbalance can include processing the updated information at the computing subsystem 408. In at least some cases, this processing occurs at least partially via the imbalance detector 518 and/or the imbalance predictor 522. Furthermore, the computing subsystem 408 can generate one or more derivatives from raw data measured via the sensor subsystem 426 and detect or predict a robot-allocation imbalance based at least partially on the derivative. For example, updated utilization information can be a derivative of measured idle time, non-idle time, or both for the mobile robots 406.

Allocations of the mobile robots 406 and of human workers at the order-fulfillment center 700 can be closely associated with one other. For example, the updated information discussed above can include updated schedule information, attendance information, and/or performance information for human workers. The imbalance predictor 522 can be configured to receive such information and determine a predicted change in human-worker allocation based at least partially on the information. The reallocation generator 526 can then determine a reallocation of the mobile robots 406 that at least partially compensates for suboptimally high or low capacities for various operation types associated with this change in human-worker allocation. In addition or alternatively, the updated information can be an indication of an actual (rather than predicted) change in human-worker allocation, such as from real-time or near real-time human-worker attendance information. Furthermore, the computing subsystem 408 can be active regarding controlling the human-worker allocation rather than being merely responsive. For example, the computing subsystem 408 can reallocate human workers via the schedule generator 530 in concert with reallocating the mobile robots 406 via the reallocation generator 526. Within any of the subfleets 404, the performance of one of the mobile robots 406 relative to another tends to be the same or similar. In contrast, the relative performance of human workers assigned to the same operation type may vary significantly. The computing subsystem 408 can use this performance information, among other inputs, as a basis for determining human-worker reallocations and complementary robot reallocations. For example, the computing subsystem 408 can reassign a human worker from one operation type to a different operation type and select one or more of the mobile robots 406 (e.g., based on current and/or predicted utilization information) to replace the reassigned human worker.

The detecting model and/or policy 520 and the predicting model and/or policy 524 can be configured to analyze any of the various forms of updated information discussed above alone or together with other information relevant to the order-fulfillment workflow and to identify a current or predicted robot-allocation imbalance, respectively, as a product of this analysis. The reallocating model and/or policy 528 and the scheduling model and/or policy 532 can be configured to determine reallocations of the mobile robots 406 and of human workers, respectively, that tend to lessen a current or predicted robot-allocation imbalance. In at least some cases, the reallocating model and/or policy 528 and/or the scheduling model and/or policy 532 process the updated information via one or more rules corresponding to known relationships between robot-allocation imbalances and robot and human worker reallocations. The reallocating model and/or policy 528 and the scheduling model and/or policy 532 can be trained and/or otherwise structured to seek a steady-state allocation of the mobile robots 406 and human workers that achieves one or more useful objectives. Examples of these objectives include maximizing throughput, minimizing bottlenecks, increasing energy efficiency, increasing floor-space availability, decreasing human-worker overtime hours, and increasing task-type variation for human workers, among many others. These objectives may be different at different times. For example, maximizing throughput may be the only objective when the order-fulfillment center 700 is operating at or near full capacity whereas other considerations may be given weight at other times.

The method 600 can also include implementing the determined reallocation (block 602*e*). This can include causing a rebalancing of the subfleets 404, a change in the numbers of mobile robots 406 within at least one of the subfleets 404, and/or switching of at least one of the mobile robots 406 from one of the subfleets 404 to another of the subfleets 404. In at least some cases, implementing the reallocation includes causing a reallocated one of the mobile robots 406 to move from the first one of the areas 702 to the second one of the areas 702 during a second time period following the first time period. This movement can be via a third one of the areas 702. For example, the first and second ones of the areas 702 can be workflow areas among the areas 702*g*-702*r* while the third area is the support area 702*e*. Reallocating the mobile robots 406 can include changing respective end effectors and/or end-effector sets of the reallocated mobile robots 406, such as from the first end effectors and/or the first end-effector sets of the first end-effector type and/or the first set type to the second end effectors and/or the second end-effector sets of the second end-effector type and/or the second set type during second time period. In at least some cases, the change in end effector and/or end-effector set occurs while the reallocated mobile robot 406 is docked at one of the stations 448. Thus, in these and other cases, reallocating the mobile robots 406 can include docking the reallocated mobile robots 406.

In at least some cases, the reallocated mobile robots 406 are among the unallocated mobile robots 456 until the reallocation is complete. The balancing module 512 can consider the unallocated mobile robots 456 as a quasi-subfleet subject to rebalancing considerations. For example, the reallocating model and/or policy 528 seeking to promote energy efficiency may tend to increase the population of unallocated mobile robots 456 beyond a minimum number. Changing end effectors and/or end-effector sets of the reallocated mobile robot 406 can include a swapping process involving unequipping equipped end effectors and/or end-effector sets and equipping different end effectors and/or end-effector sets. In some cases, this swapping occurs manually. For example, FIGS. 13 and 14 illustrate third and fourth human workers 752, 754 engaged in this operation. When the swapping is manual, implementing a reallocation of the mobile robots 406 can include generating an instruction to equip the reallocated mobile robots 406 with the correct end effectors or end-effector sets in accordance with the reallocation being implemented. The computing subsystem 408 can communicate this instruction via the interface devices 424, via the reallocated mobile robots 406, via handheld devices (not shown) carried by the third and fourth human workers 752, 754, and/or in another suitable manner.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms. References herein to any of receiving, determining, or generating information in accordance with various embodiments of the present technology encompass, when feasible, the others of receiving, determining, and generating the information and indicate that such operations can occur at least partially via the relevant computing subsystem.

Directional terms, such as "upper," "lower," "front," "back," "vertical," and "horizontal," may be used herein to express and clarify the relationship between various structures. It should be understood that such terms do not denote absolute orientation. The term "centroid" as used herein refers to a center-like data element for a given shape in three-dimensional space. There are several known approaches to calculating centroids including approaches of greater and lesser precision. No particular approach is contemplated herein. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A method comprising:

implementing an order-fulfillment workflow via an order-fulfillment system including a fleet of mobile robots, wherein the fleet includes a plurality of subfleets of the mobile robots, and wherein the subfleets are assigned to different respective operation types within the order-fulfillment workflow;

receiving, at a computer system of the order-fulfillment system, updated information for the order-fulfillment workflow;

determining, via the computer system, a reallocation of at least some of the mobile robots among the subfleets based at least partially on the updated information; and implementing the reallocation, wherein implementing the reallocation includes changing respective end effectors of reallocated mobile robots among the mobile robots of the fleet.

2. The method of claim 1, wherein changing the respective end effectors of the reallocated mobile robots includes changing the respective end effectors from first end effectors of a first end-effector type to second end effectors of a second end-effector type different than the first end-effector type.

3. The method of claim 2, wherein:

the reallocated mobile robots are bimanual and respectively equipped with end-effector sets before implementing the reallocation; and implementing the reallocation includes changing the respective end-effector sets of the reallocated mobile robots from first end-effector sets of a first set type to second end-effector sets of a second set type different than the first set type.

4. The method of claim 2, wherein:

the first end-effector type is a non-suction end-effector type; and the second end-effector type is a suction end-effector type.

5. The method of claim 2, wherein:

the first end-effector type has a first number of degrees of freedom; and the second end-effector type has a second number of degrees of freedom different than the first number of degrees of freedom.

6. The method of claim 1, wherein:

the operation types include a first operation type and a second operation type different than the first operation type;

the subfleets include:

a first subfleet including a plurality of the mobile robots respectively equipped with first end effectors of a first end-effector type corresponding to the first operation type, and a second subfleet including a plurality of the mobile robots respectively equipped with second end effectors of a second end-effector type corresponding to the second operation type and different than the first end-effector type;

the method further comprises executing, during a first time period, first operations of the first operation type via the first subfleet and second operations of the second operation type via the second subfleet;

changing the respective end effectors of the reallocated mobile robots includes changing the respective end effectors of the reallocated mobile robots during a second time period after the first time period;

the method further comprises executing, during a third time period after the second time period, additional first operations of the first operation type via the first subfleet and additional second operations of the second operation type via the second subfleet; and the reallocated mobile robots are within the first subfleet during the first time period and are within the second subfleet during the third time period.

7. The method of claim 6, wherein:

the order-fulfillment system includes an inventory system having:

an inlet port, an outlet port, an inventory area between the inlet port and the outlet port, and a shuttle robot configured to move inventory totes between the inlet port, the inventory area, and the outlet port;

the first operations and the additional first operations occur within the order-fulfillment workflow upstream from the inventory system; and the second operations and the additional second operations occur within the order-fulfillment workflow downstream from the inventory system.

8. The method of claim 6, wherein:

the order-fulfillment system includes a sorting system having:

a tote area, a conveyor configured to receive items and to convey the items toward the tote area, and a sorting robot configured to sort items from the conveyor into totes at the tote area;

the first operations and the additional first operations occur within the order-fulfillment workflow upstream from the sorting system; and the second operations and the additional second operations occur within the order-fulfillment workflow downstream from the sorting system.

9. The method of claim 6, wherein:

executing the first operations and the additional first operations occur at a first area of an order-fulfillment center;

executing the second operations and the additional second operations occur at a second area of the order-fulfillment center different than the first area; and implementing the reallocation includes causing, via the computer system, the reallocated mobile robots to move from the first area to the second area during the second time period.

10. The method of claim 9, wherein:

changing the respective end effectors of the reallocated mobile robots includes changing the respective end effectors of the reallocated mobile robots at a third area of the order-fulfillment center different than the first and second areas; and causing the reallocated mobile robots to move from the first area to the second area includes causing the reallocated mobile robots to move from the first area to the second area via the third area.

11. The method of claim 10, wherein:

the order-fulfillment system includes stations at the third area;

the method further comprises docking the reallocated mobile robots at the stations during the second time period; and changing the respective end effectors of the reallocated mobile robots includes changing the respective end effectors of the reallocated mobile robots while the reallocated mobile robots are docked at the stations.

12. The method of claim 2, wherein:

the order-fulfillment workflow includes a plurality of queues;

the order-fulfillment system includes a plurality of queue sensors operably associated with respective queues of the plurality of queues;

the method further comprises receiving, at the computer system, queue information from the queue sensors; and the updated information includes updated queue information.

13. The method of claim 1, wherein the updated information includes updated order information for orders to be fulfilled via the order-fulfillment system.

14. The method of claim 13, wherein:

the method further comprises processing the updated order information via a machine-learning model of the computer system; and determining the reallocation includes determining the reallocation based at least partially on a result of processing the updated order information via the machine-learning model.

15. The method of claim 1, wherein the updated information includes updated utilization information for utilization of at least some of the mobile robots of the fleet.

16. The method of claim 15, further comprising:

measuring, via a mobile robot of a first one of the subfleets, a first idle time, a first non-idle time, or both for the mobile robot of the first one of the subfleets;

measuring, via a mobile robot of a second one of the subfleets different than the first one of the subfleets, a second idle time, a second non-idle time, or both for the mobile robot of the second one of the subfleets; and determining, via the computer system, the updated utilization information based at least partially on the first idle time, the first non-idle time, the second idle time, the second non-idle time, or a combination thereof.

17. The method of claim 2, wherein the updated information includes updated throughput information for respective throughputs of at least some of the operation types within the order-fulfillment workflow.

18. The method of claim 17, wherein the updated information includes updated backlog information for respective backlogs of at least some of the operation types within the order-fulfillment workflow.

19. The method of claim 1, wherein the updated information includes updated schedule information for human workers within the order-fulfillment workflow.

20. The method of claim 1, wherein:

a first one of the operation types is tote moving; and a second one of the operation types is item moving.

* * * * *